(12) United States Patent
Gormish et al.

(10) Patent No.: US 7,734,824 B2
(45) Date of Patent: Jun. 8, 2010

(54) TRANSPORT OF REVERSIBLE AND UNREVERSIBLE EMBEDDED WAVELETS

(75) Inventors: Michael Gormish, Redwood City, CA (US); Serene Banerjee, Austin, TX (US)

(73) Assignee: Ricoh Co., Ltd., Tokyo (JP)

( * ) Notice: Subject to any disclaimer, the term of this patent is extended or adjusted under 35 U.S.C. 154(b) by 1194 days.

(21) Appl. No.: 10/273,734

(22) Filed: Oct. 18, 2002

(65) Prior Publication Data

US 2004/0078491 A1 Apr. 22, 2004

(51) Int. Cl.
*G06F 15/16* (2006.01)
*G06K 9/54* (2006.01)

(52) U.S. Cl. .................. 709/247; 709/246; 382/305
(58) Field of Classification Search .............. 709/231, 709/236, 246–247
See application file for complete search history.

(56) References Cited

U.S. PATENT DOCUMENTS

| | | | |
|---|---|---|---|
| 7,096,368 B2* | 8/2006 | Kouznetsov et al. | 713/189 |
| 7,103,357 B2* | 9/2006 | Kirani et al. | 455/426.1 |
| 2002/0087728 A1* | 7/2002 | Deshpande et al. | 709/246 |

FOREIGN PATENT DOCUMENTS

| | | |
|---|---|---|
| JP | 2002-149153 | 11/2000 |
| WO | WO 00/24188 | 4/2000 |
| WO | WO 01/86941 A3 | 11/2001 |
| WO | WO 02/15011 A3 | 2/2002 |

OTHER PUBLICATIONS

Deshpande, S., et al., "Scalable Streaming of JPEG2000 Images using Hypertext Transfer Protocol," In Proc. ACM Multimedia, Oct. 2001, pp. 1-9.
Boliek, Martin, et al., "JPEG 2000 for Efficient Imaging in a Client/Server Environment," Author Distributed, Ricoh California Research Center, pp. 1-12.
JPIP AHG Group, "JPEG 2000 Client-Server Protocol Requirements Draft" Coding of Still Pictures, ISO/IEC JTCI/SC29/WGI N 2380, Nov. 15, 2001, pp. 1-10.
Wright, Adam, et al., "An Implementation of JPIP based on HTTP," Author Distributed, Elysium Ltd (UK), Feb. 14, 2002, pp. 1-3.
Prandolini, Robert, "JPIP Ad Hoc Meeting Report," Coding of Still Pictures, ISO/IEC JTC 1/SC 29/WG 1 (ITU-T SG-16), Feb. 2002, pp. 1-17.
Author Unknown, "Indexing JPEG 2000 Files for JPIP," Author Distributed, WG 1 N2444, second draft, Mar. 21, 2002, pp. 1-12.
Taubman, David, "A Very Simple Proposal for JPIP," Coding of Still Pictures, ISO/IEC JTC 1/SC 29/WG1 N2445, Mar. 11, 2002, pp. 1-27.

(Continued)

*Primary Examiner*—Peling A Shaw
(74) *Attorney, Agent, or Firm*—Blakely, Sokoloff, Taylor & Zafman LLP

(57) ABSTRACT

A method and apparatus for transporting portions of a codestream over a communications mechanism is described. In one embodiment, the method comprises sending a request over a network and receiving tile-parts of a JPEG 2000 compliant codestream from the network as a return type as part of a response to the request.

19 Claims, 9 Drawing Sheets

OTHER PUBLICATIONS

Prandolini, Robert, et al., "JPIP Ad Hoc Meeting Report—Mar. 2002," Coding of Still Pictures, ISO/IEC JTC/SC29/WG1 N 2511, Mar. 22, 2002, pp. 1-12.

Prandolini, et al., "Call for JPIP Technology Proposals," Coding of Still Pictures, ISO/IEC JTC1/SC29/WG1 N 2550, Mar. 21, 2001, pp. 1-3.

JPIP AHG Group, "JPIP Requirements and Profiles," Coding of Still Pictures, ISO/IEC JTC 1/SC 29/WG 1 (ITU-SG8), Mar. 22, 2002, pp. 1-6.

JPIP Group, "Summary of JPIP Break-Out Discussion on Server Return Data," Coding of Still Pictures, ISO/IEC JTC1/SC 29/WG 1 (ITU-T SG8), Mar. 22, 2002, pp. 3.

Canon Group, "Proposal for JPIP Tier 2 Protocol," Coding of Still Pictures, ISO/IEC JTC 1/SC 29/WG 1 N2608, Jun. 28, 2002, pp. 1-69.

* cited by examiner

TRANSPORT OF REVERSIBLE AND UNREVERSIBLE EMBEDDED WAVELETS

FIELD OF THE INVENTION

The present invention relates to the field of image communication. In particular, the invention relates to the communication of portions of an image and associated metadata over a communications channel.

BACKGROUND OF THE INVENTION

JPEG2000 was designed to provide access to different regions, resolutions, and levels of quality of an image without decoding the entire JPEG 2000 file. Various progression orders were also defined so that a file transmitted over a slow communication channel would "progress" in a certain way, e.g., from low resolution to high resolution, or from low quality to high quality. Also of interest was the ability to choose portions of the image in an order other than the order the file was stored. In general, someone might interactively select a region and quality of the image for transmission.

J. Li and H.-H. Sun, in "Virtual Media (Vmedia) Access Protocol and its Application in Interactive Image Browsing", *Proc. SPIE Conf. on Multimedia Computing and Networking*, vol. 4312, pp. 99-110, Jan. 22-23, 2001, San Jose, Calif., proposed a virtual media (Vmedia) access protocol and developed an interactive JPEG 2000 browser with Vmedia. They use code-block access as the basic elements. Their cache implementation has priority bits.

M. Boliek, G. K. Wu and M. J. Gormish, in "JPEG 2000 for Efficient Imaging in Client/Server Environment", *Proc. SPIE Conf. on App. of Digital Imaging*, vol. 4472, pp. 212-223, Jul. 31-Aug. 3, 2001, San Diego, Calif., define a client/server environment to transport JPEG 2000 images. Their work defines "smart client," "dumb client," "smart server," and "dumb server." They provide examples of JPEG 2000 byte usage in a "pan and zoom" session and describe a protocol based on Internet Imaging Protocol (IIP), Version 1.0.5, 6 October 1997. The protocol described here extends some of the ideas from Boliek, et al., "JPEG 2000 for Efficient Imaging in Client/Server Environment", *Proc. SPIE Conf. on App. of Digital Imaging*, vol. 4472, pp. 212-223, Jul. 31-Aug. 3, 2001, San Diego, Calif., paper but relies on HTTP as defined in R. Fielding, J. Gettys, J. C. Mogul, H. Frystyk, L. Masinter, P. Leach, T. Berners-Lee (Editors), Hypertext Transfer Protocol—HTTP/1.1, RFC 2616, June 1999 for transport.

Sachin Deshpande and Wenjun Zeng, in "Scalable Streaming of JPEG2000 Images using Hypertext Transfer Protocol", *Proc. ACM Conf. on Multimedia*, pp. 372-381, Oct. 2-4, 2001, send JPEG 2000 images using HTTP. However, they send a separate index file with header information and then use HTTP byte range requests to get the desired image pieces. Their protocol allows pipelining of requests, but not interruption. It suffers from an extra roundtrip time to get the index file. Their examples are highly inefficient because multiple byte ranges are sent with "Content-Type: multipart/byteranges;" with a boundary value. In one case, there is 70 bytes of overhead for 48 bytes of data.

Wright, R. Clark, G. Colyer, in "An implementation of JPIP based on HTTP", ISO/IEC JTC 1/SC 29/WG 1 N2426, Feb. 14, 2002, Elysium Ltd., UK, describe use of HTTP "Accept-Ranges:" with values such as bytes, jp2-boxes, and j2k-packets. The main disadvantage of their approach is the need to end the initial connection and open a new connection after determining the server supports these additional range types. Their work is not a full definition of a JPEG 2000 interactive protocol.

D. Taubman, in "A Very Simple Proposal for JPIP", ISO/IEC JTC 1/SC 29/WG 1 N2445, Mar. 13, 2002, Univ. of New South Wales, Australia, uses precincts and code-blocks as the basic elements of JPEG 2000 file transfer. He defines a protocol, using binary containers, specifying acknowledgements and session information, and using byte ranges of precincts as the fundamental return type. In contrast, this protocol uses self-labeled tile-parts as the basic elements for communication. This way both the client and the server have copies of valid JPEG 2000 codestreams.

R. Prandolini, S. Houchin, R. Clark, in "Call for JPIP Technology Proposals", ISO/IEC JTC 1/SC 29/WG 1 N2550, Mar. 21, 2002, issued a call for proposals for JPEG 2000 Interactive Protocol (JPIP). Their document describes a sequence of pan and zoom steps someone might use with a browser and ask for measurements of efficiency. No technology is defined in the call for proposals.

Canon, "Proposal for JPIP Tier 2 protocol," 28 Jun. 2002, WG1N2608, was an answer to the call for proposals that defines a full protocol and access to individual codeblocks or larger portions of a JPEG 2000 file. Their proposal also defines an Application Programmers Interface (API) for the protocol.

SUMMARY OF THE INVENTION

A method and apparatus for transporting portions of a codestream over a communications mechanism is described. In one embodiment, the method comprises sending a request over a network and receiving tile-parts of a JPEG 2000 compliant codestream from the network as a return type as part of a response to the request.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus to communicate portions of a JPEG 2000 image (or other compressed images) over a network is described. A syntax for communication of requests and responses based on HTTP and allowing image and object access is described herein. File format objects are accessed by specifying boxes, and codestream elements are returned in tile-parts, the codestream's native elements. A protocol for interpreting the request syntax and defining the responses is also set forth. An architecture for dividing the effort of image communication is presented.

Overview

Figure 1:
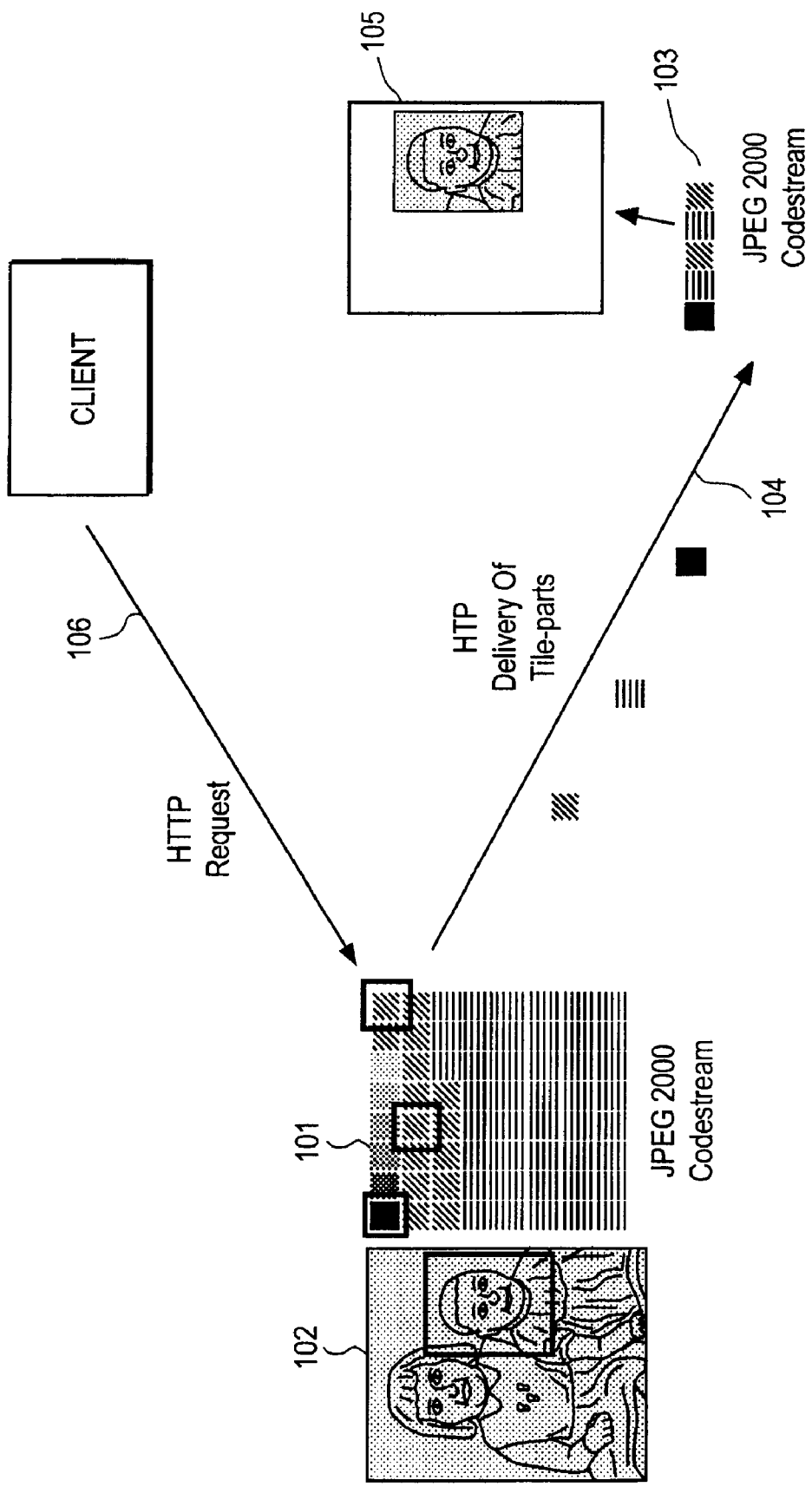
FIG. 1 illustrates providing simple image access.

FIG. 1 illustrates a transport protocol providing image access. Referring to FIG. 1, a client issues an initial request 106 to a server (e.g., an Apache server, a special purpose image server, etc.). The server contains a JPEG 2000 file that contains at least one JPEG 2000 codestream which could be decompressed to obtain an image 102. The system deliver portions (e.g., tile-parts) of the JPEG 2000 codestream 101 to the client over a return channel 104. The client is able to use just the received tile-parts 103 as a legal JPEG 2000 codestream and decode these to form some part of the image 105. The image at the client may be smaller than the image on the server in several ways, including a reduced spatial region, a reduced quality, a reduced number of components, and a reduced resolution. The delivery may occur over communication facilities such as a network (e.g., local area network (LAN), wide area network (WAN), Internet, World Wide Web (WWW), etc.). In one embodiment, the system uses HTTP/1.1 along with some parameters and extensions to provide access to JPEG 2000 files from remote locations. In one embodiment, already existing features of both HTTP/1.1 and the JPEG 2000 file formats and codestreams are used to accomplish this, as will be described in further detail below. In an alternative embodiment, the system may employ other protocols, such as, for example, TCP/IP, UDP, SONET, to provide access to JPEG 2000 files.

In one embodiment, support exists for multiple divisions between a client and a server. On the client side, image objects are used, while on the side of the originating server (i.e., there could be intermediate servers between the client and originating server) byte ranges are used. A sequence of stages may be used to go from image objects to byte ranges. The transition from one stage to the next may be over a network, via a HTTP connection or locally implemented with a function call. A "protocol" and a multi-level "API" for both clients and servers is defined herein.

A variety of very different clients may employ the teachings herein. In one embodiment, clients having no memory outside of a display device are provided with image objects. In another embodiment, one or more of the clients in the system understand more about JPEG 2000 than a typical server and may specify the portions of the codestream desired.

Alternatively, a protocol that is not based on HTTP may be used. However, a protocol not based on HTTP may have to provide techniques to obtain one or more of the following capabilities: pass through firewalls, proxy and caching techniques (e.g., those available for the World Wide Web (WWW)) security, authentication, and document modification time determination techniques.

While the transport technique described herein operates with any JPEG 2000 file or codestream, those codestreams divided into tile-parts are transported more efficiently. In one embodiment, JPEG 2000 files are arranged for transport prior to use of the protocol. Therefore, the protocol described herein does not need to be optimized for every variety of JPEG 2000 file that may be created. This leads to a considerable reduction in the number of syntax elements required and the processing required on the client and the server.

A Transport Architecture

Figure 2:
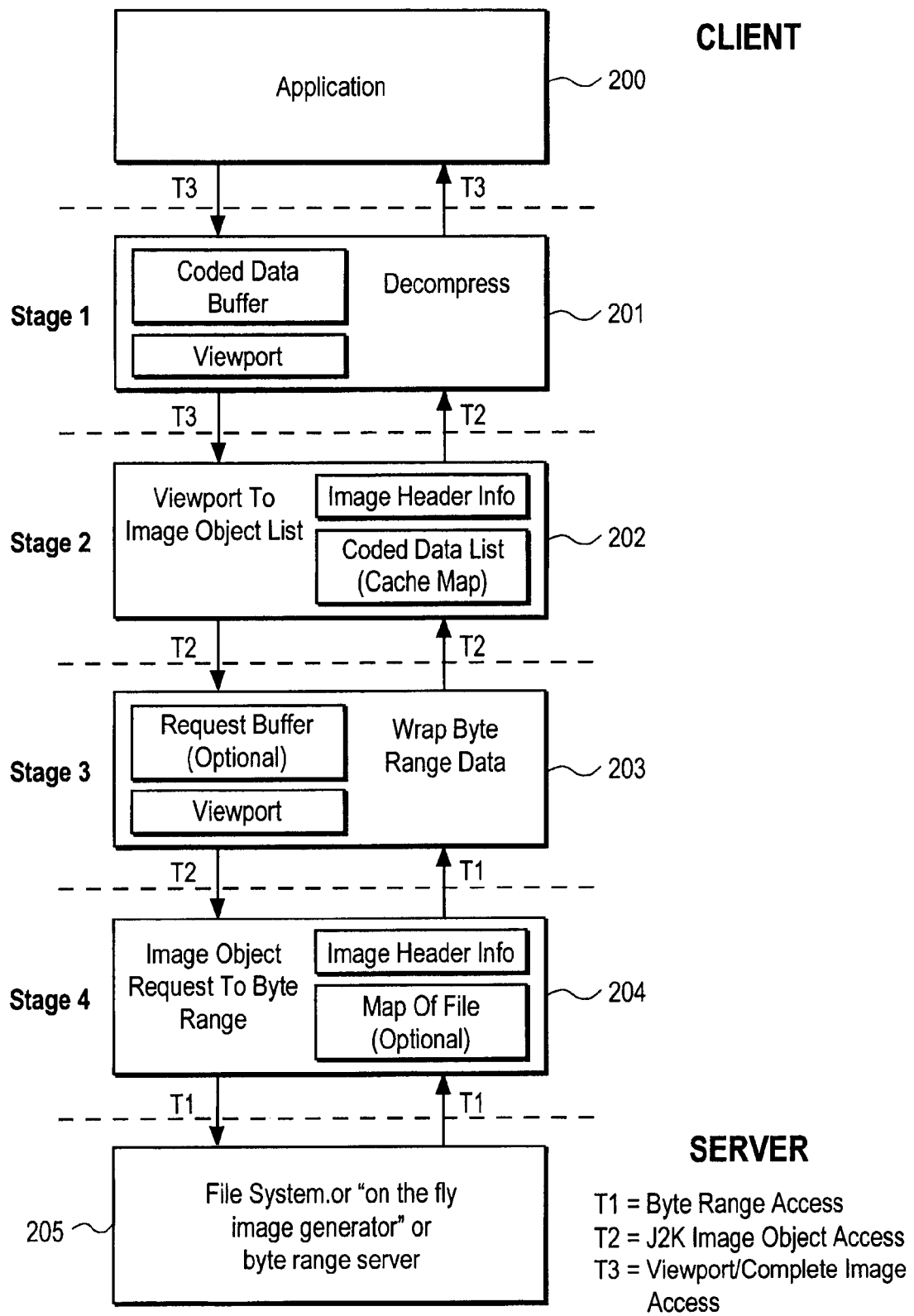
FIG. 2 illustrates an exemplary software architecture.

FIG. 2 illustrates one embodiment of a transport protocol software architecture. Communication between client and server can be thought of as passing through four stages as shown in FIG. 2. In one embodiment, these four stages include the decompressor (Stage 1), the viewport-to-image mapper (Stage 2), the image object wrapper (Stage 3), and the image object request-to-byte range converter (Stage 4).

Referring to FIG. 2, the client may comprise an application 200 like a web browser and the server may comprise a file system or an on-the-fly image generator 205. In one embodiment (e.g., FIG. 3), all JPEG 2000 capabilities for dealing with a JPEG 2000 file reside on server, i.e. stage one 201, stage two 202, stage three 203, and stage four 204 all reside on the same system as file system 205. Client application 201 is sent a complete image file in a format it knows (e.g., JPEG). This may be useful for legacy clients because the server can return an image client application 201 can use (return a JPEG, or PNG) or when client application 201 has an extremely limited memory or computation.

At each "stage" shown in FIG. 2, either the request type is translated from one tier to another or the response type is translated from one tier to another, where each tier is a type of communication. Thus, requests and responses at the client end are thought of as image objects. In one embodiment, image objects are regions of a screen or sheet of paper where it is desirable to place an image and the uncompressed color converted bits that should fill those regions. At the file-system, communication is in terms of byte ranges. In one embodiment, byte range communication comprises a sequence of fseek( ) and fread( ) calls a C program might use. In an alternative embodiment, byte range communication comprises fread( ) calls only with unwanted data being discarded. Note that the teachings of the present invention are not limited to C programming and other programming languages or systems (and their associated calls) may be used. For example, Microsoft Computer of Redwood, Wash., has products that would use a different set of calls. One could use Java of Sun Microsystems of Mountain View, Calif., to perform byte range communication in a different way. Also, files could be brought into memory, and memory accesses used.

In one embodiment, the division between client and server can occur in any of the five places shown as dashed lines in FIG. 2. In one embodiment, the client includes the stage one processing so that communication with the server takes place in a compressed form. The client (e.g., a web browser) may perform JPEG 2000 decompression with a library. In one embodiment, the communication across the dashed lines is via HTTP when the division between the client and the server occurs at that particular dashed line. In such a case, in one embodiment, the communication is by function call if the client or server includes both sides of the dashed line.

More specifically, in FIG. 2, T1 refers to byte range access, T2 refers to JPEG 2000 image object access, and T3 refers to view port/complete image access. If the division between client and server is between stages 2 and 3, then the client is making http requests of JPEG 2000 image objects. If the division of the protocol occurs between Stage 4 and file system 205, then the client is responsible for all JPEG 2000 knowledge.

Figure 3:
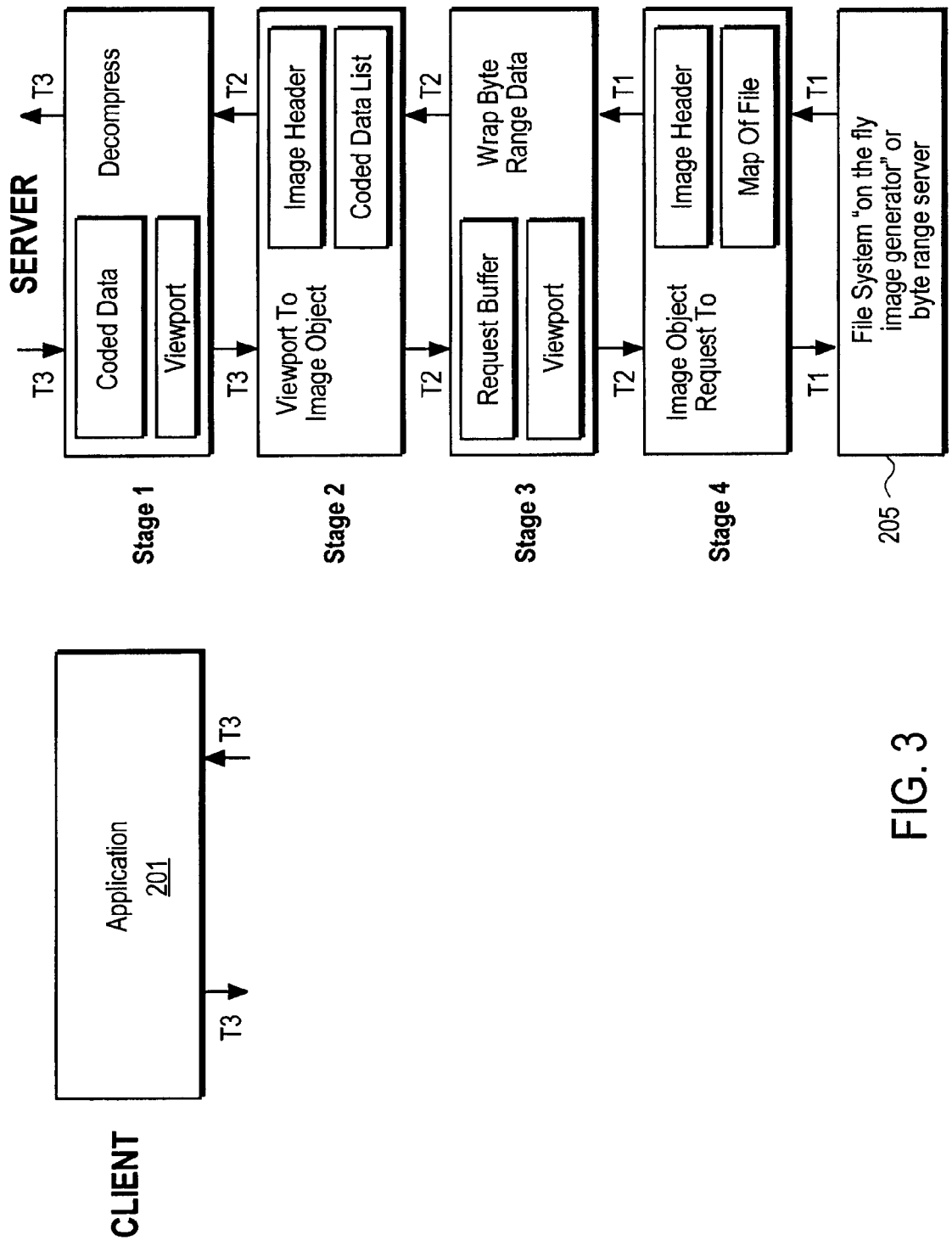
FIGS. 3-7 illustrate various client-server divisions.

FIG. 3 illustrates tier 3 communication in which the division between the client and server occurs between client application 200 and the decompressor (Stage 1). There are a number of potential uses for this configuration. For example, this might be used for a client having no cache and a DCT-based JPEG decoder only. This division may also be used for an API for an application connected to a local server or for situations in which backward capability is required for currently existing browsers.

Figure 4:
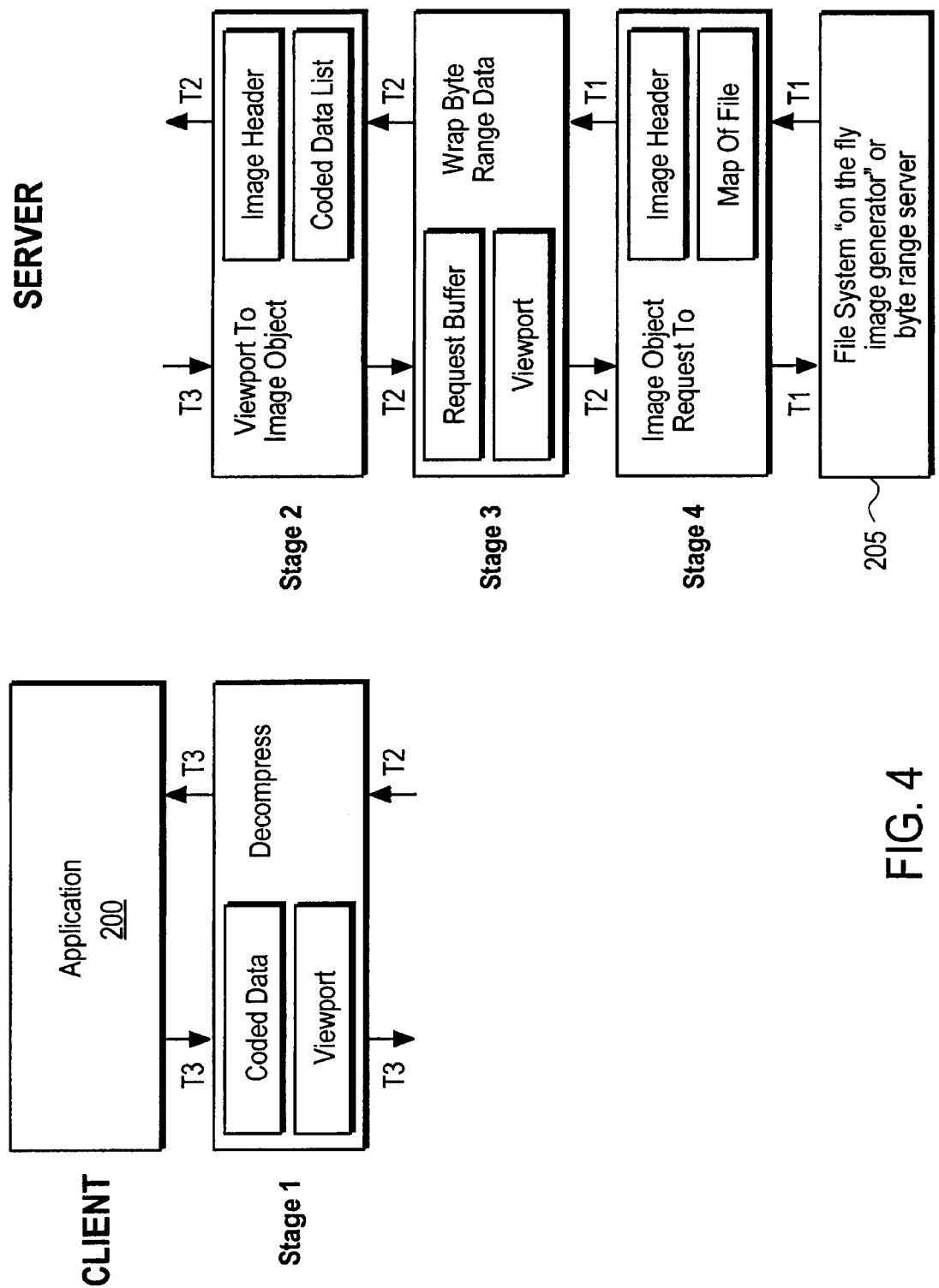

FIG. 4 illustrates a tier 3 request and a tier 2 response in which the division between client and server occurs between stages 1 and 2. The potential uses for this configuration includes simple requests and efficient transport, pan and zoom clients, and browsers with a JPEG 2000 plug-in or browsers that natively support JPEG 2000.

Figure 5:
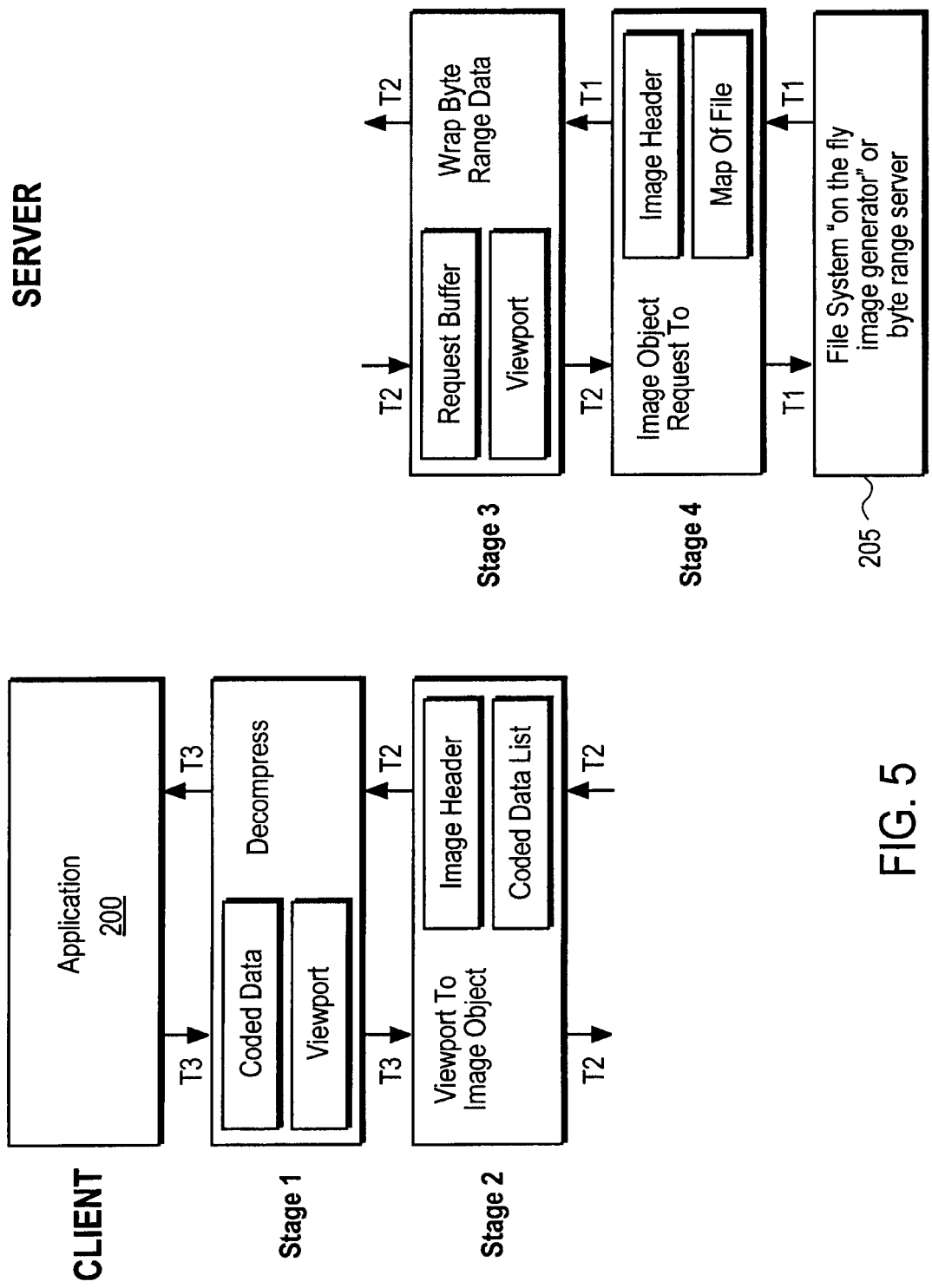

FIG. 5 illustrates a tier 2 request and a tier 2 response in which the division between client 201 and server 202 occurs between stages 2 and 3. Such a system has potential uses in situations where the client knows more about the user needs than the server.

Figure 6:
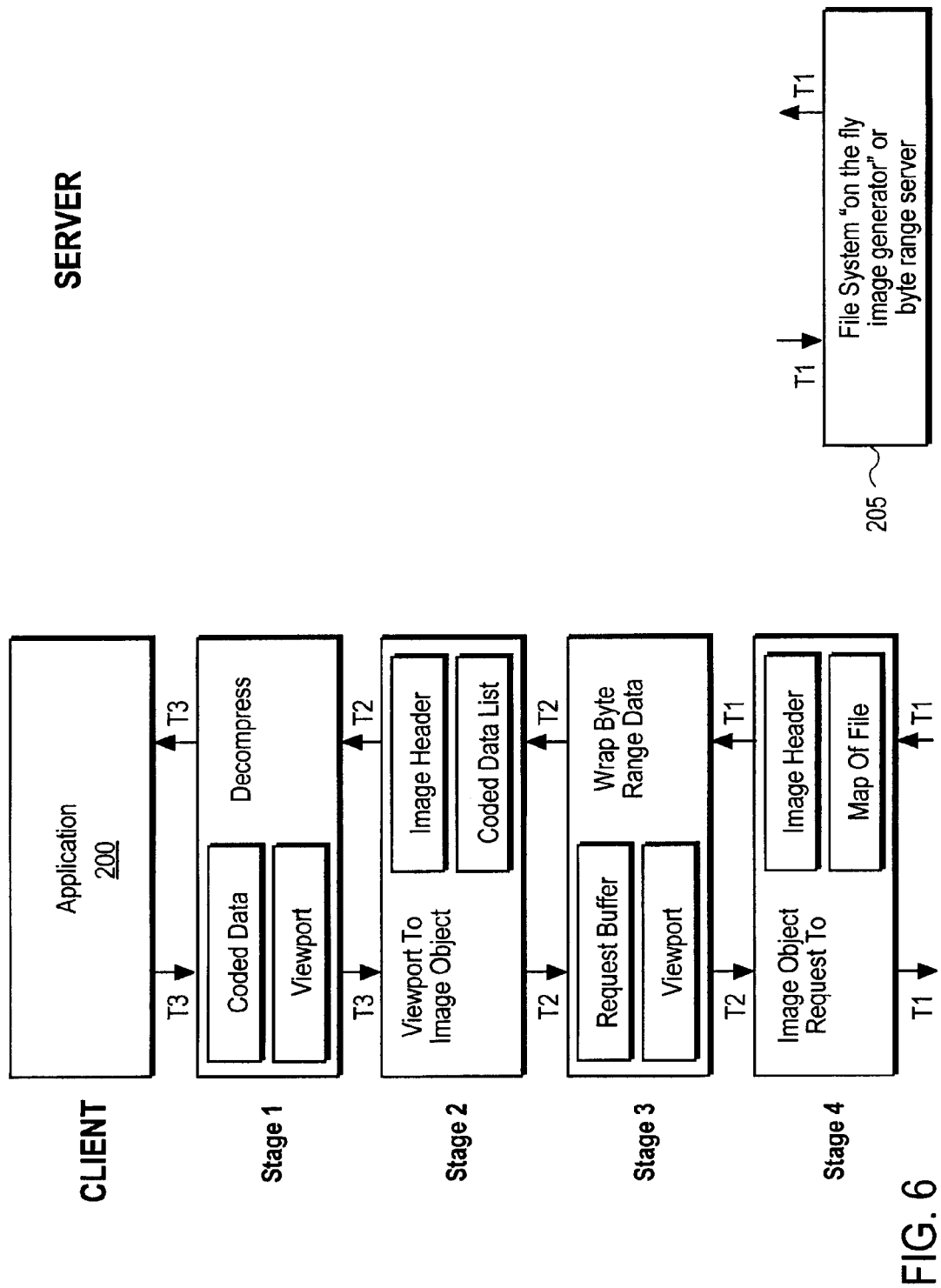

FIG. 6 illustrates a tier 1 request and a tier 1 response in which the division between client and server is between stage 4 and file system 205. This has a potential use for a non-JPIP aware server.

Figure 7:
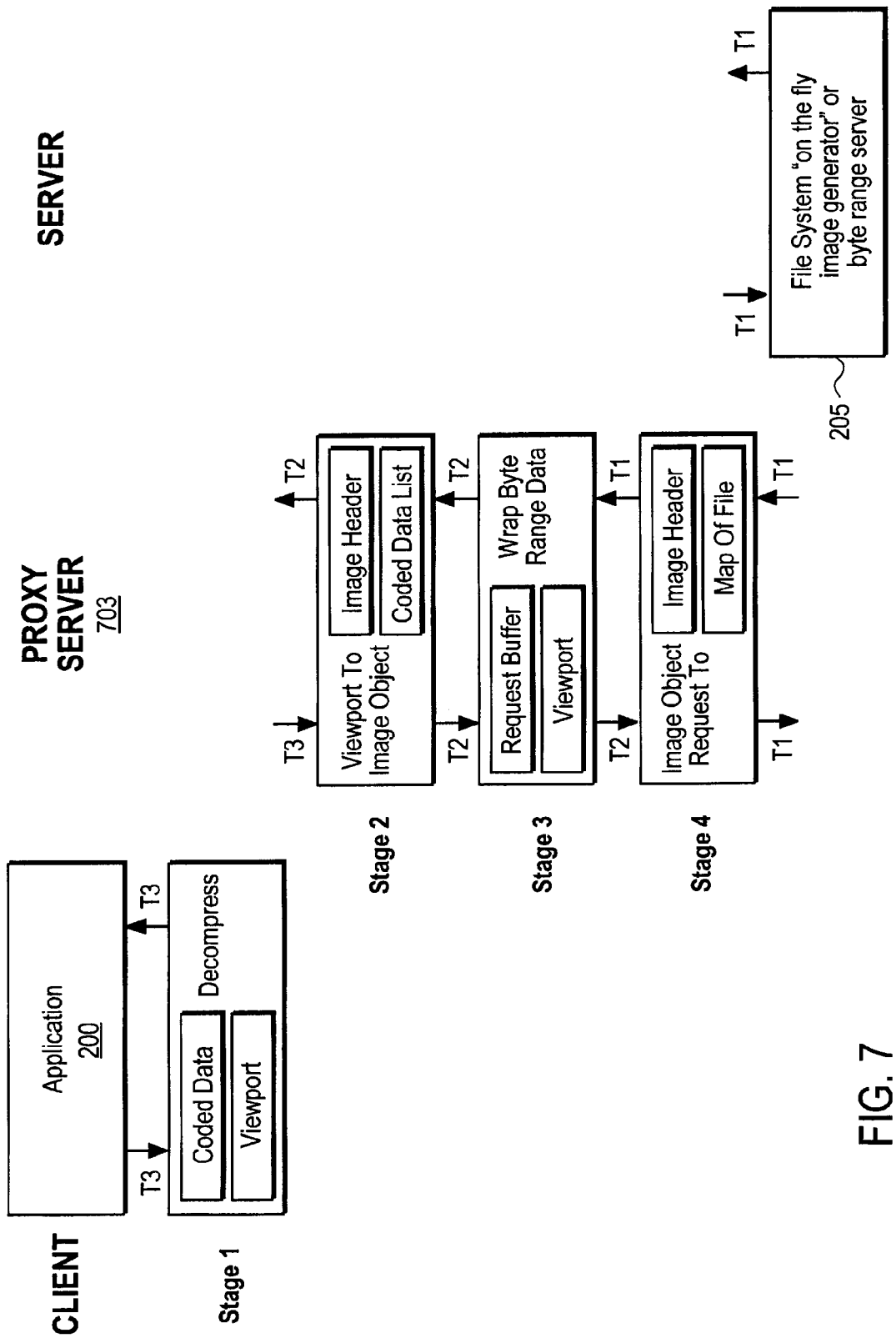

FIG. 7 illustrates a situation in which a proxy server is used. Referring to FIG. 7, there is a division between stage 1 and stage 2 as well as stage 4 and file system 202. More specifically, proxy server 703 is responsible for stages 2 through 4. In one embodiment, file system 205 is an Apache server. In this embodiment, legacy servers (e.g., Apache, servers that support byte range requests, etc.) may be used, JPEG 2000 client pan/zoom may be supported in a fashion well-known today, and intermediate proxy servers may be used. Although only one proxy server is shown, there could be more than one server in between client and server handling one or more stages. Further, alternatively, the stages handled by proxy server 703 may be more than or less than stages 2 to 4.

With this architecture, it is possible to have more than single client and server interaction. For example, a client application might include code that communicates only with complete image objects. To display an image, that client application might communicate with a local server. This local server may even be on the same machine that is running on the client application. The local server may be connected by a high bandwidth connection. That server, in turn, might communicate with another server over a low bandwidth connection using Tier 3 requests but receiving Tier 2 responses. This second server could be the "originating" server for the image, or it might communicate, over a high bandwidth connection, with a "dumb" server which only understand byte range requests. Each of these servers can maintain a cache.

While the implementation within a client or server could be divided into the stages as shown, this is not necessary. A server might, for example, contain a single body of code that handles a number of stages together, such as stages 2, 3, and 4. This allows some image information like the main header to be stored only once and not duplicated within different stages.

Stage 1: Decompressor

In one embodiment, the decompressor stage converts a sequence of Tier 2 responses and a current "viewport" into image data. The viewport is the portion of the entire image the client is interested in. It often is a subset of components, a lower resolution, and only a small spatial region. Essentially, the decompressor stage runs a "normal" JPEG 2000 decompressor on the received data, decoding the region the client desires. In one embodiment, the decompressor is implemented by running a decoder to generate the entire full resolution image, cropping to the region of interest and scaling to the resolution of interest. In one embodiment, only those portions of the file necessary for the resolution, region, components, and quality desired are decoded. The saves computation resources and memory. In an alternative embodiment, the system always decodes the whole image, but only the number of components and resolution desired.

In one embodiment, the decompressor uses the Kakadu JPEG 2000 decoder. The kdu_expand program allows decoding of low resolution, decoder regions of interest, and a reduced number of components. There is a direction relationship between the window query and the decoder command-line.

In one embodiment, the decompressor doesn't actually start the kdu_expand program and instead equivalent functionality is compiled into a dynamic link library (DLL). In one embodiment, the decompressor does use external files for the received JPEG 2000 codestream and the decoded image to be displayed on screen. This allows simple caching when the client is terminated. In one embodiment, a JPEG 2000 library is called to provide the image in memory rather than using an external file for the decoded image. This can increase the response speed.

Other JPEG 2000 libraries could be used instead of Kakadu. For example, a library to expand the requested region to the nearest tile boundry and decodes full tiles may be used. A client could use this to speed up the display of images when panning without crossing a tile boundry. The image decoded by this library would be cropped to show the user only the requested view, but small changes in the viewport would lead to simply recropping and displaying the already decoded image. Likewise, when a user region request contained material from a new tile, it would be possible to decode only those tiles and add them to the reconstruction image in memory. In this case, running the JPEG 2000 decoder on the full client view would only be necessary to improve the quality of the image displayed when new coded data was received.

Stage 2: Viewport to J2K Mapper

This viewport-to-JPEG 2000 mapper stage uses information about the JPEG 2000 file to convert viewport requests into tile-parts. In one embodiment, if this stage doesn't have the header information already, it requests it. In one embodiment, this stage maintains a copy of image header information so that future viewports can be rapidly converted to JPEG 2000 tile parts, and this stage also maintains a list of the responses transferred to Stage 1 to avoid repeating requests for image objects that it already has transferred to Stage 1.

For communication via tile-part, the mapping of a viewport to a set of tiles is performed. The mapper converts the desired region of the image to "reference grid units" as defined in the JPEG 2000 Part 1 standard (ITU-T Rec. T. 800 ISO/IEC 15444-1:2002-JPEG 2000 Image Coding Standard). The mapper uses XTsiz, YTsiz, XTOsiz, YTOsiz, XOsiz, and YOsiz portions of the SIZ marker segment to determine which tiles intersect with the region of interest. The resolution, quality, and region, which is obtained from the Tier 3 request syntax, are used to determine the tile-parts needed. In one embodiment, the mapper is only looking at the tiles that intersect the region of interest (as specified by the query string) as specified by the SIZ marker, which specifies tile locations.

More specifically, for communication via tile-part, the mapping of a viewport to a set of tile-parts is performed. Portions of the image (resolution, spatial region, quality, and components) are provided in the client request, either explicitly or with default values. The mapper converts the desired region of the image to "reference grid units" as defined in JPEG 2000 Part 1 standard (ITU-T Rec. T. 800 | ISO/IEC 15444-1:2002 JPEG 2000 Image Coding Standard). The reference grid units for each tile are determined by the XTsiz, YTsiz, XTOsiz, and YTOsiz parameters of the SIZ marker segment in the JPEG 2000 codestream. Only tile-parts from tiles that intersect the requested region are sent. Which tile-parts within a tile to send depends on the requested resolution and quality, and the organization of the coded data into tile-parts. In one simple embodiment, one tile-part is used for each resolution, from low to high. In this case, the number of tile-parts delivered depends only on the resolution requested.

Figure 9:
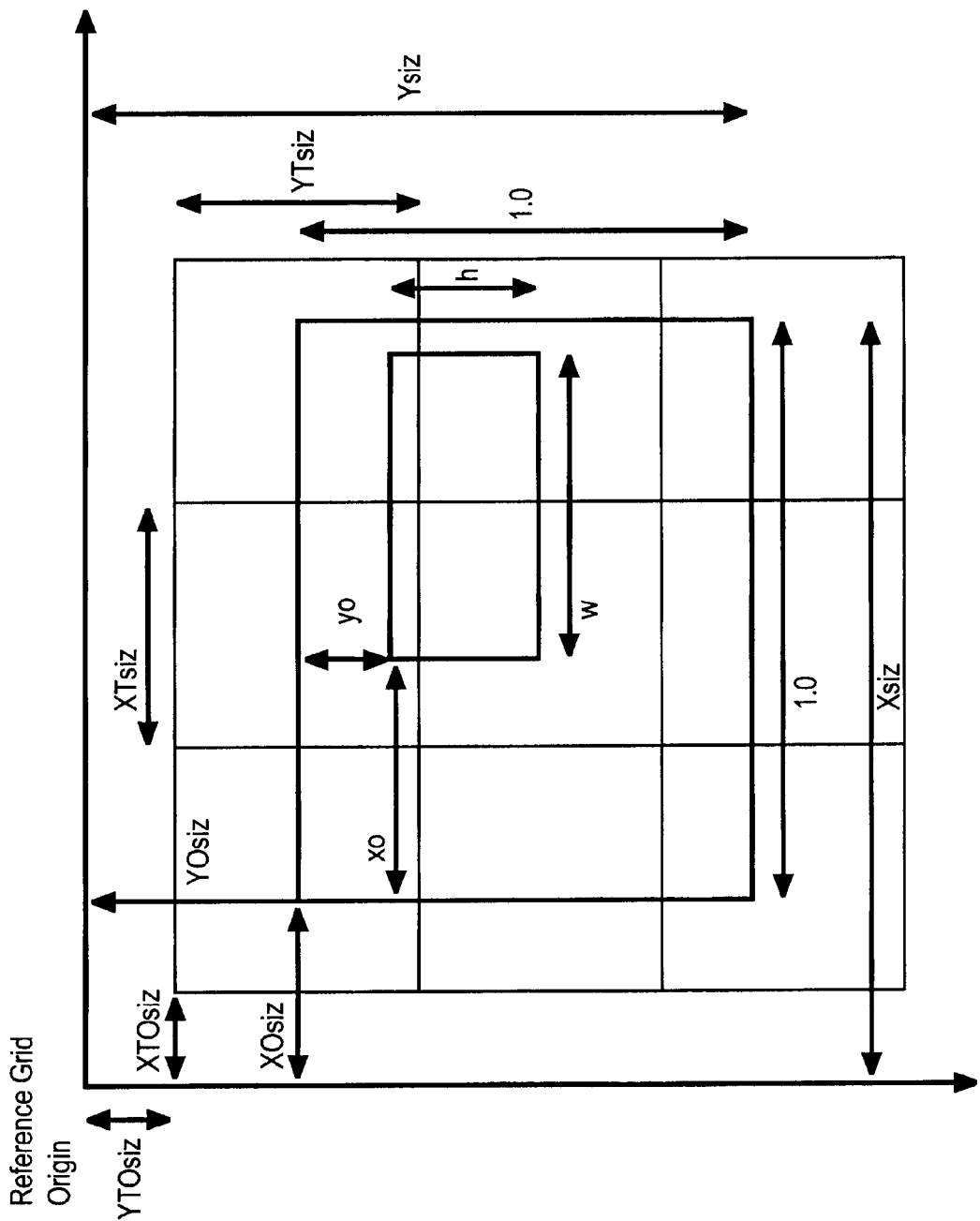
FIG. 9 illustrates a correspondence between viewport query parameters and SIZ marker segment parameters.

FIG. 9 illustrates the correspondence between viewport query parameters and SIZ marker segment parameters. Referring to FIG. 9, XTOsiz, YTOsiz, XOsiz, YOsiz, XTsiz, YTsiz, Xsiz, and Ysiz all come from the SIZ marker segment, xo, yo, w, and h are viewport request parameters. The correspondence between the two parameter sets is that Xsiz-XOsiz is the number of reference grid samples corresponding to 1.0 in the horizontal direction in query parameter space, thus w and xo can be converted to reference grid units by multipling by (Xsiz-XOsiz). Likewise, in the vertical direction, h and yo can be converted to reference grid units by multiplying by Ysiz-YOsiz.

In one embodiment, information about each of the tile-parts is stored in a structure. This structure may be a memory for stage 2. This structure has two bits, where one bit indicates whether the tile-part would have to be sent to the client for the current request, and the other bit indicates whether or not that tile-part has been sent. Thus, there are two bits for each tile part. If the tile-part is present in the cache, the second bit is turned on, indicating that tile-part need not be transmitted. If the tile-part is not present in cache, and if it is needed, as indicated by the first bit, the tile-part is transmitted to the client, and the second bit is turned on, to avoid retransmission. Alternatively, this structure could be expanded to store information that indicates the priority for each tile-part rather than solely using one bit to indicate if it could be sent.

From the codestream, the SOT marker gives the details of tile indices and the number of bytes required for each tile-part. In one embodiment, from the code stream, the appropriate bytes, corresponding to the tile parts that need to be sent, are transmitted to the client side. In case the viewport changes, and the corresponding relevant tiles also change, then only the tiles that have not been sent earlier are sent to update the display image.

Stage 3: Image Object Wrapper

Stage 3 is responsible for taking a byte range response and creating an image object. In one embodiment, the image object wrapper buffers the sequence of image object requests so that a response from stage 4 like the following:
HTTP/1.1 200 OK
[other header lines]
Content-Range: 200-500/23383
CRLF
Data can be converted to a response in image object terms. In the case where only whole tile parts are returned, this stage might do nothing but remove the "Content-Range:" line from the HTTP response. In one embodiment, it might wrap the data with a different header.

In one embodiment, stages 3 and 4 are completely integrated. This combined stage might be executing fseek( ) and fread( ) calls to obtain the desired data, wrap the returned data in an HTTP response, and provide it to stage 2.

In one embodiment, the transport protocol is extended to support objects which, unlike tile parts and boxes, are not self labeling. In this case, the image object wrapper wraps the returned data with an identifier. In one embodiment, this wrapping might be an HTTP header in the form:
Packet: r=0&layer=0&component=2&position=5&tile=7

The new header might also be a sequence of bytes in the message body that precedes the coded data.

Stage 4: J2K to Byte Range Converter

The J2K-to-byte range converter (Stage 4) is responsible for converting compressed image objects requests to byte range requests. In one embodiment, to do so, it may need to make several byte range requests to obtain the main header, the location of various codestream boxes, and tile parts. In most cases, the converter buffers this information to avoid multiple accesses. The converter returns the requested image objects only, even if multiple reads were necessary to determine the location of the request, where the location refers to the byte range of tile part in JPEG 2000 file.

In one embodiment, before sending the header, the server parses the JPEG 2000 file until it reaches the header for the JPEG 2000 codestream. At this point, the server may send codestream headers or, alternatively, the parsed file, to the converter. Thus, the converter ignores all data before the start of the codestream box header indicated by 0x6A703263. Then, the converter reads the SOC and SIZ markers to obtain the number of tiles. All tile-parts in the codestream begin with a SOT marker segment. The SOT marker segment includes the length of the tile-part. The converter reads the SOT marker to obtain the length of the tile-part and saves the length of the tile-part and the location of the tile-part in the JPEG 2000 file, and the converter skips to the next SOT marker. Therefore, after the viewport-to-J2K mapper indicates that it requires a set of tile-parts, the converter gets the corresponding file location of the tile-part from the created memory structure. That is, as it parses the file, it stores these in memories and sends the tile-parts to the client. The TLM marker in the main header of the codestream also stores the tile-part locations and lengths. Therefore, in one embodiment, the TLM marker could also be used to determine the tile-part positions in the JPEG 2000 file.

In other words, the byte range requests may be generated by using TLM marker segment in the main header of the JPEG 2000 codestream, or by reading each TLT marker (and skipping to the next TLT marker segment). In either case, stage 4 is able to build a list with 4 entries: tile index, tile part number, offset from beginning of file, and length of tile part. The tile index, tile part number, and length are all part of the TLT marker segment. As stage 4 reads each TLT marker segment, it can save the offset from the beginning of the file. Then when a request is generated for a particular tile index and part number, stage 4 finds the tile-part in the generated list. The entries in the list for offset and length are used for byte-range requests.

While parsing, the converter reads all bytes before the start of the JPEG 2000 codestream. Speed up can be obtained by reading "box" headers i.e., by reading the "box" type and the "box" length, and skipping the boxes, which are not relevant.

In one embodiment, the converter is connected to a file system and makes system calls to read the file. It may be connected to a server (e.g., an Apache server) that does not support JPIP but does support byte range requests. Alternatively, this stage may be connected to a database which is responsible for storing the JPEG 2000 image.

Tier 3 Returns JPEG or PNG Files

A Tier 3 response is a complete image object. In one embodiment, it should be either a PNG or JPG file suitable to fill the viewport.

Tier 2 Returns Boxes and Tile-Parts

Because Tier 2 returns boxes and tile-parts without additional "wrapping," the responses to requests can be concatenated in order to form a valid JPEG 2000 file or codestream. This is typically done by the client or computer system or machine performing Stage 1. This may also occur in a cache, memory, or disk. A client can therefore make use of a JPEG 2000 decoder that has no understanding of JPIP or transport. The local disk cache for a browser can be filled with usable images that can be copied into other directories or otherwise manipulated as JPEG 2000 files.

In one embodiment, the transport protocol uses HTTP, which assumes a reliable ordered channel. This relieves the client or stages from doing some amount of error detecting.

Transport Protocol Definition

Request Syntax

Requests can be made at 3 different tiers: Tier 3, "whole image objects," Tier 2, "coded data object level," and Tier 1, "byte-ranges." However, in one embodiment, all requests use the HTTP syntax, and some overlap occurs. For example, requests for non-image data, e.g., "boxes" in JPEG 2000, are the same at the image and object level. Further, a client might wish to access most data on the image level, but some portion of meta data e.g., sound associated with an image (especially if it is large enough that it might interfere with other uses of the channel) might be accessed with byte-range. For example, any time more than approximately 200 bytes of metadata aren't needed, the overhead of making a request is made up for. Access to some data by byte-range allows JPEG 2000 files, with meta-data the server does not understand, to be accessed in smaller units than an entire box.

Tier 3 Requests

In one embodiment, a Tier 3 request looks like
GET filename.jp2?res=2 HTTP/1.1
Host: truew.crc.ricoh.com
CRLF These are all components of a standard HTTP request. "GET" is the method. "filename.jp2" is the file name or more generally a full URL, and could be the whole path from root directory of the server. All items after the "?" are name=value pairs typical for CGI interactions. This query string does not contain spaces (they can be included as %20 see the HTTP rfc [see Fielding, Gettys, Mogul, Frystyk, Masinter, Leach, Berners-Lee (Editors), Hypertext Transfer Protocol—HTTP/1.1, RFC 2616, June, 1999, referred to herein after as the "HTTP Standard".]). The final "HTTP/1.1" defines the protocol. Portions of the protocol may work with versions of HTTP prior to version 1.1. HTTP requests end with two carriage return and line feed pairs. "CRLF" represents carriage return line feed but the characters have been left off the end of each line in the examples, unless they are the only characters in the line.

In one embodiment, instead of including the parameters in the query string of the HTTP GET request, they may be included in the body of a HTTP POST request. This is useful if the options, as discussed below, are long.

In one embodiment, an example of a POST request is:
POST /cgi-bin/j2k_server.cgi HTTP/1.1
Host: truew.crc.ricoh.com
Content-type: application/x-www-form-urlencoded
Content-length: 26
CRLF
filename=picture.jp2&res=2

The options available for describing a Tier 3 viewport are listed in Table 1 below. Additional parameters affecting the request are listed in Table 2 below. These options are the same for the get and post methods.

TABLE 1

Viewport Parameters For Tier 3 Requests

| Parameter | Type | Range of Values | Default | Meaning |
| --- | --- | --- | --- | --- |
| xo | Float | 0.0-1.0 | 0.0 | horizontal offset into image |
| yo | Float | 0.0-1.0 | 0.0 | vertical offset into image |
| w | Float | 0.0-1.0 | 1.0 | width of image |
| h | Float | 0.0-1.0 | 1.0 | height of image |
| res | Int | 0-10 | 0 | number of resolutions to reduce the image by before sending |
| maxw | Int | $0-2^{31}$ | 0 | Maximum width in grid units of returned image |
| maxh | Int | $0-2^{31}$ | 0 | Maximum height in grid units of returned image |
| components | String | [0123456789-,] | empty | comma separated list of components to return |
| quality | Int | 0-0xFFFF | 1 | higher values indicate higher quality desired |

Note that are all these parameters are not required. Some of these parameters have default values, e.g., by default all components are sent for a region that matches the image. In one embodiment, they can all be omitted and the default value will be used.

Explanation of Parameters

The parameters xo, yo, w, and h specify a region of an image with zero indicating the top or left edge and one indicating the bottom or right. Width and height specify the fraction of the image with one representing the whole width or height. Thus, in one embodiment, xo=0&yo=0&w=1&h=1 specifies the whole image (the default). On the other hand, a central section of the image would be given by xo=0.25&yo=0.25&w=0.5&h=0.5. The left edge is assumed to be at the XOsiz position on the reference grid, the top edge is assumed to be at YOsiz. See FIG. 9 and the definition of the SIZ marker segment in Annex A of Part 1 [ITU-T Rec. T.800 | IS 15444-1:2000, Information Technology—JPEG 2000 image coding system: Core coding system.].

The parameter res is the number of resolutions to reduce the image by: res=1 reduces the image by roughly a factor of 2 horizontally and vertically. The reduction is done in the JPEG 2000 way, so an image 7 grid points wide might have a reduced width of either 4 or 3 samples depending on the value of the offset in the SIZ marker.

The parameters maxw and maxh specify the maximum number of samples the client is interested in receiving. This is an alternative to specifying the amount of reduction using the "res=" parameter. This is also a way to specify the desired width and height at a specific resolution. For example, a client without knowledge of the original image size may request an image with a maximum width or height of 128 samples. The server reduces the resolution until the request can be met, or until only the LL subband is returned. Thus, it is possible (but unlikely) that a request for a maximum image of 128 by 128 still returns a 512 by 512 image if zero levels of wavelet transform were employed in the compression.

The components parameter is a string specifying which components to include. In one embodiment, components are numbered from zero. Ranges may be used. Thus, components=0-2,5 returns components 0, 1, 2 and 5, for example.

The quality parameter helps a server determine how much data to send. The server may choose to use the quality value as the number of layers to return. In one embodiment, a request of 0xFFFF for quality requests all data the server has for the tile-parts in the region.

Table 2 lists an additional set of parameters that may be used with a query to control other aspects of the response. The Tier 3 value requests a response as a full image in "png" or DCT based JPEG format.

TABLE 2

Other Parameters For Tier 3 Requests

| Option | Type | Range of Values | Default | Meaning |
|---|---|---|---|---|
| tier3 | String | "png" or "jpg" | empty | requests a tier 3 response (image object) rather than the tier 2 default |
| Boxes | String | Special | empty | comma separated list of boxes or sub-boxes requested |
| Notboxes | String | Special | empty | comma separated list of boxes not to return |
| maxboxsize | Int | $0\text{-}2^{64}$ | 0 | size of the maximum box to return, boxes larger than this will not be returned unless requested with the boxes = option |
| Priority | Float | [+|−] NNN.NNN or, "Inf" | 0 | priority of this request relative to other requests |

The boxes parameter is a way to specify a list of boxes in which the client is interested. Boxes are defined for different JPEG 2000 file formats in JPEG 2000 Part 1, Part 2, Part 3, and Part 6. These are boxes at the top level of the codestream. Boxes inside of boxes can be requested by listing the superbox and the subbox. In the case of multiple boxes, the server may choose to return all or just the first box of that type. A range of boxes can be specified with brackets. A range of [0-] insures the server returns all boxes of the type.

The maxboxsize parameter allows all boxes less than the specified number of bytes to be returned. This allows any boxes that might be present to be obtained as long as they do not slow communication too much.

Note that boxes with types using characters outside the allowable set are URL-encoded. For more information on URL encoding, see the HTTP rfc [HTTP Standard] or rfc 2396.

If neither "boxes" nor "notboxes" is listed, the server may decide what boxes to return. In one embodiment, a server may decide to return all boxes, all boxes prior to the codestream, all boxes the creator of the image specified when storing the image on the server, or no boxes at all. In one embodiment, a configuration file in the server may allow any or all of these options. Some portion of a codestream is returned unless notboxes=jp2c.

Examples of request parameter and value pairs, and their meaning, follows:
boxes=jp2h
get the JP2 Header box.
boxes=jp2h/ihdr
get only the Image Header box within the JP2 Header box
boxes=uuid[5-7]
get the 5th, 6th, and 7th UUID boxes (if they exist).
maxboxsize=4096
return boxes 4096 bytes or smaller The priority parameter indicates the importance of the request relative to other requests. If a new priority is equal to the previous priority, the server may continue sending bytes for the old request if it is at all useful for the new request. If the difference between the new priority and the old priority is one or more, the server may stop the old request at the next opportunity and begin the new request. If the priority is "Inf", the server stops the old request in favor of the new request. A server may choose to send data later for a previously interrupted request when data applying to the current request has been sent.

Additional HTTP Header Lines for Tier 3

Table 3 shows two header lines that can be used to specify the data available at the client.

TABLE 3

HTTP header lines for Tier 3 requests

| Header | Content | Meaning |
|---|---|---|
| T3cache | viewport query string | client has received a response for this query |
| T2cache | tile-part list | client has received these tile-parts |

The T3 cache allows the client to indicate the regions it has already received either in this session or in a previous session. A server may use this to compute the tile-parts that would have been sent for these requests and not send them again. A server may ignore this parameter. For example, a server which is not capable of recognizing, it will ignore it.

EXAMPLE

T3 cache: xo=0.0&y0=0.0&w=0.25&h=0.25&res=2
T3 cache: maxw=128&maxh=128

Note that the contents of the cache are the responses to prior viewport requests. In one embodiment, there is one request per T3 cache header line. This request is not sent as part of the query string, but as an HTTP header line. It is assumed that the main header has been received if any T3 Cache line is used. The client is not required to list all requests that are cached. In fact, the client might list each received request once and use this line as an acknowledgement. The server can translate the prior requests into lists of tile-parts and mark these tile-parts as sent. Then these tile-parts will not be resent when the current request is translated.

The T2 cache allows the client to list the tile-parts that have been received. The syntax is defined herein. It corresponds to an exemplary method for requesting tile-parts. Again, in one embodiment, this line is an HTTP header line rather than part of the query string. An example is as follows:

T2 cache: 4.0,4.1,5.0-6.2

Tier 2 Requests

Tier 2 supports requests for boxes in the same manner as Tier 3. Tile-parts can also be explicitly requested using the HTTP range header. Effective use of Tier 2 requests for tile-parts depends on the client and server agreeing on some division of the coded data into tile-parts. Tiles might be divided into tile-parts at every resolution or every layer or other methods. One useful division is described in more detail further below. An example request for Tier 2 is:

GET file.jp2 HTTP/1.1
Host: truew.crc.ricoh.com
Range: tiles-parts=4.0,5.0,8.0-9.2
CRLF The value before the period is the tile number, and the value after the period is the tile-part number (Isot and TPsot from Annex A of JPEG 2000 Part I [ITU-T Rec. T.800 | IS 15444-1:2000, Information Technology—JPEG 2000 image coding system: Core coding system]). Note that in one embodiment both tile numbers and tile part numbers are indexed from 0. A range of tile-parts includes all tiles from the start tile to the stop tile and all parts for these tiles from the start to the stop. For example, 8.0-9.2 is equivalent to 8.0,8.1,8.2,9.0,9.1,9.2.

In one embodiment, since tile-parts have two parameters (Isot for the tile, and TPsot for the part), it might be better to use a new HTTP header line instead of "Ranges:" which was designed for one dimensional ranges. For example, a "Tile-part:" header can be used, such as Tile-parts: 8.0,8.1,10.0-12.2

Tier 1 Request Syntax

Tier one requests are exactly byte range requests as defined in HTTP [HTTP Standard]. For example:

GET file.jp2 HTTP/1.1
Host: truew.crc.ricoh.com
Range: bytes=200-500,1000-1500
CRLF As indicated above, the request is for 300 bytes starting at position 200 and 500 bytes starting at position 1000. Such requests are typically useful only after the client knows what to expect at the given byte ranges. However, they may be useful to access portions of an audio stream associated with an image, for example, without transferring the entire audio stream.

In one embodiment, instead of listing the cache information in separate lines, the client can include cache information in the HTTP query string itself. For example, suppose the user enters a query string as:

GET filename.jp2?xo=0.0&y0=0.0&w=0.25&h=0.25&res=2&maxx=750&maxy=750 HTTP/1.1

The client then parses the file in the cache, in the same way that it parses the file on the server side as described in Stage 2 (viewport to JPEG 2000 mapper). The client forms a list of the tile-parts it already has in the cache and appends it to the query string before sending it to the server. So, the server gets the query string as:

GET filename.jp2?xo=0.0&y0=0.0&w=0.25&h=0.25&res=2&maxx=750&maxy=750&T2 cache=4.0,5.0,8.0,8.1, 8.2,8.3,9.0,9.1,9.2,9.3 HTTP/1.1

Of course, a variety of syntaxes can be used to specify the viewport. The recent drafts of the JPEG 2000 Part 9 Standard use syntax similar to that given below. Most parameters can be translated between different types of request syntaxes by someone of ordinary skill in the art.

TABLE 1a

Viewport Parameters for Tier 3 Requests (based on JPEG 2000 Part 9 working draft)

| Parameter | Type | Range of Values | Default | Meaning |
|---|---|---|---|---|
| Offset | Int, Int | $0\text{-}2^{31}, 0\text{-}2^{31}$ | 0, 0 | horizontal offset into image, vertical offset into image |
| Size | Int, Int | $0\text{-}2^{31}, 0\text{-}2^{31}$ | | width of request region, height of request region |
| Frame-size | Int, Int | $0\text{-}2^{31}, 0\text{-}2^{31}$ | | The resolution at which the client wants to see the image |
| Components | List | [0123456789-,]* | empty | comma separated list of components to return |
| L | int | 0-0xFFFF | 1 | higher values indicate higher quality desired |
| Bh | int | 0-0xFFFF | 0xFFFF | Hard limit on the bytes of data that the server can actually send |
| Bs | int | 0-0xFFFF | 0xFFFF | Soft limit on the bytes of data that the server can actually send |
| ADD | bool | 0 or 1 | 0 | Flag to specify whether the next requested window can be concatenated with previously requested windows |

Explanation of Parameters

The parameters Offset=Px,Py and Size=Sx,Sy specify a region of an image starting Px samples from the left edge, and extending for Sx samples to the right, starting Py samples from the top and extending Sy samples down. The left edge is assumed to be at the XOsiz position on the reference grid, the top at YOsiz. See the definition of the SIZ marker segment in Annex A of JPEG 2000 Part 1. These samples are assumed to be at the resolution specified by the Frame-size parameter.

The parameter Frame-size=Rx,Ry is the resolution at which the client wants to view the image. Rx and Ry can vary from 0 to image dimensions. However, in the JPEG 2000 domain, the decoded image can be viewed only at a finite number of resolution levels. So, depending on the client's request, the server sends a resolution R'x and R'y, so that R'x≧Rx and R'y≧Ry. If R'x and R'y differ from Rx and Ry, the server needs to send this information in a header. As described in the JPEG 2000 Part 1, reduced resolution images are rounded at the left and right edges depending on the exact position. For example, an image 7 grid points wide might have a reduced width of either 4 or 3 samples depending on the value of the offset in the SIZ marker.

Depending on R'x and R'y, the offset of the upper left hand corner and the width and height of the requested region change as: P'x=Px*R'x/Rx, P'y=P'y*R y/Ry, S'x=Sx*R'x/Rx, and S'y=Sy*R'y/Ry, where P'x and P'y are the actual offsets and S'x and S'y are the actual widths and heights of the displayed image on the client canvas.

The Components parameter is a list of integers that specifies which components to include. Components are numbered from zero. Ranges may be used. Thus, Components=0-2,5 returns components 0, 1, 2 and 5.

The L=quality parameter helps a server determine how much data to send. The server may choose to use the quality value as the number of layers to return. In any case, a request of 0xFFFF for quality requests all data the server has for the tile-parts in the region.

Parameters Bh and Bs are optional parameters with which the server can set a hard or soft limit on the number of bytes that are actually sent. Low-resolution tile-parts can be sent first and the higher resolution tile-parts are sent, until it reaches this limit. If this field is not present, then the server can send whatever tile-parts are necessary to display the requested region at the particular resolution.

If the flag, ADD, is set to yes, then new requests can be concatenated with the previously requested windows. By default, this flag is disabled, and whenever a new window is requested, the client replaces the previous window.

Response Syntax

Tier 3 Responses

A Tier 3 response is a complete image object. In one embodiment, it should be either a PNG or JPG file suitable to fill the viewport. A response of this type might look as follows:
HTTP/1.1 200 OK
Content-type: image/jpeg
Content-length: 20387
CRLF
JPEG Compressed Image Data Note that it is preferred but not required to use the chunked transfer coding as explained for Tier 2 responses below.

Tier 2 Responses

A Tier 2 response consists of the requested boxes, the codestream mainheader (if not sent previously), and the requested tile parts concatenated, wrapped with an HTTP header, and sent using "Transfer-Encoding: chunked". Because Tier 2 responses can be very large, and thus take a long time to transmit, it is important to be able to stop in the midst of transmission. For example, an image with 1K×1K tiles might yield a 1.5 megabyte response (over a slow link this would take a long time). Unless "Transfer-Encoding: chunked" is specified, HTTP requests must specify the full length of the body in a "Content-Length:" header or indicate the end of data by closing the connection. Although either of these are possible, neither of these is desirable, since it may be desired to stop the current response and send more data on the same connection for a new request. With chunks, the length of each chunk is sent and a zero length is sent to end the response. Thus, once a chunk is started, it must be completed, but the entire response need not be completed before ending the response.

An example chunked response is:
HTTP/1.1 206 Partial Content
Content-Range: 0-2000,4000-10200/867370
Transfer-Encoding: chunked
Content-type: image/jpeg2000
CRLF
1000
[4096 (or 1000 HEX-DECIMAL) bytes of JPEG 2000 data]
[4096 (or 1000 HEX-DECIMAL) bytes of JPEG 2000 data]
8
[8 bytes of JPEG 2000 data]
0

The first header line in the example above uses the "partial content" header to indicate the response is not the entire file. The "Content-Range" header is used to indicate what parts of the file are sent. The "Transfer-Encoding:" header is used to indicate the data will be chunked. The type of data is provided, since the response is a decodable JPEG 2000 file the type is given as "image/jpeg2000". Other types could be used.

For responses after the first, the response does not contain a valid J2K codestream (at the very least it will be missing the main header). In this case, it may be advisable to indicate this by using a different type, e.g., "image/jPiP".

In one embodiment, if a new request was received after sending the first chunk of 4096 bytes and the server decided to end transmission, the server completes the current box, main header, or tile-part and then indicates a 0 length chunk. Thereafter, the new response can be started with a new HTTP header.

Tier 1 Responses

In one embodiment, Tier 1 responses are the same as byte range responses as defined in HTTP [the HTTP Standard]. It is still advisable to use the chunked transfer encoding, so that data can be terminated early.

Request/Response Semantics

After receiving a request, the server listens for more requests while sending chunks.

The server may gracefully end the current response if the priority of new request is sufficient and begin responding to the new request. In one embodiment, sufficient priority is indicated by a request with "Inf" priority. The server finishes the current tile part and then sends a chunk size of 0 to indicate no more chunks are being sent for the current request. In one embodiment, the server adds HTTP footers and then begin the next response.

If the server receives a priority other than "Inf", it may decide how much of the current request to continue with. It may be that the current request is a good answer to the new request, and no action may be necessary. For example, the new request might be a different view but sill need the same set of tile parts. It is suggested that if the new request has a priority higher by one than the previous request, that the old request be suspended at the end of the current tile-part in favor of the new request.

Eventually, in one embodiment, the server sends a brief response to match all requests. Alternatively, syntax may be used that is defined to indicate that a response answers several requests. If this is done, a server continues to send tile-parts relevant to the new or old request without stopping the current transfer and starting with a new HTTP header. In one embodiment, if this is done, the server does not use the "Content-Range:" header when it starts a request that may be extended.

Server Data Storage Format

In one embodiment, the transport protocol functions with all JPEG 2000 file formats and codestreams. However, functioning in this manner may not always be efficient. For example, if no tiles are used, then a request for a region could result in the return of the entire codestream.

The most efficient way to compress images for use with the transport protocol depends on the nature of accesses expected. For a sequence of "pan and zoom" operations as defined in "Call for JPIP technology proposals" [JPIP Editors (Prandolini, Houchin, Clark), Call for JPIP technology proposals, ISO/IEC JTC1/SC29/WG1 N 2550, 21 March 2002] using a tile size of N/16×N/16 is good for square images of size N×N pixels.

One progression order for the codestream that may be used is resolution-layer-component-position (RLCP). The tiles can be split into tile-parts at every resolution and every layer. In one embodiment, all tile parts for the low resolutions are stored in the file before tile-parts of higher resolutions. This allows low resolution portions to be accessed with a minimum number of disk accesses. In one embodiment, sufficient quality is stored in the first layer to avoid tile boundary artifacts.

Sometimes it is desirable to be able to browse low resolution versions of an image stored losslessly. In RLCP order, the fact that the image is stored losslessly means there are a large number of bits used for the low resolution image. This can make pan and zoom browsing of the image too slow over a low speed connection between the client and the server. This problem can be overcome by storing the image on the server in a special way. The layer-resolution-component-position (LRCP) progression order is used for the codestream, but the initial layers are used to store data in primarily resolution order. The last layer is used to contain the lossless representation of the image. Each layer is assigned to its own tile-part so that the server can provide the desired resolution to the client by sending complete tile-parts. For example, a single 256×256 tile with 3 resolution levels might be organized as follows:

Tile-part 0 contains layer 0 which contains 128 bytes of resolution 0 data (total for all components and positions). This provides a fairly high quality but still lossy image to the client (equivalent to 1 bit/pixel at the viewing resolution).

Tile-part 1 contains layer 1 which contains 384 bytes of resolution 0 and resolution 1 data. The number of bytes of resolution 0 and resolution 1 data are chosen to maximize image quality at resolution 1 display resolution.

Tile-part 2 contains layer 2 which contains 1536 bytes of resolution 0, 1, and 2 data. Most of the bytes are in resolution 2, with enough of the other resolutions for optimal image quality at resolution 2 display resolution.

Tile-part 3 contains layer 3 which contains 6144 bytes of resolution 0, 1, 2, and 3 data. Tile-parts 0-3 contain an optimized 1 bpp image at full resolution.

Tile-part 4 contains layer 4 which contains the rest of the data for all resolutions needed to provided a lossless image. Perhaps 24,000 bytes for a grayscale image and more for color. Of course, this tile-part might be split into additional tile-parts to provide a 2.0 bits/pixel image and then the lossless image. Alternatively, it could be split into tile-parts to maintain some maximum tile part size.

Transport Protocol Performance

Disk Accesses and Number of Coefficients Required

Table 4 lists the number of distinct locations within a file that are be accessed by a server responding to an image request. Table 4 also lists the number of coefficients that must be sent if a whole tile or precinct is sent in response to a request. Of course, the number of bytes that must be sent depends primarily on the compression ratio, but assuming equal compression regardless of tile or precinct size, these values are related to response size.

Table 4 shows data for several different viewports, and shows only the additional access/coefficients needed for the new viewport assuming the data for the previous requests has been sent.

For the values in Table 4, the commands used to compress are:

Tiling: kdu_compress -i lena.bmp -o out.jp2 -rate -,0.25 Clayers=30 Creversible=yes Stiles={128,128} Corder=RLCP Results for tile sizes: 128×128; 256×256; 512×512; 1024×1024; un-tiled are reported in the table.

Precincts: kdu_compress -i lena.bmp -o out.jp2 -rate -,0.25 Clayers=30 Creversible=yes Cprecincts={128,128} Corder=RPCL Results for precincts sizes of 32×32; 64×64; 128×128; 256×256; 512×512, are reported in the table the same size precincts are used in each resolution.

Table 4 should not be thought of as a comparison with precincts and tile-parts because precincts can also use smaller sizes at each resolutions as tiles are required to do.

TABLE 4

Disk Access And Coefficients Dependence On Tile And Precinct Size

| Client Side Viewing Window (512 × 512) | Size of Tile | Size of Precinct | Number of disjoint locations accessed on the server end | | Number of wavelet coefficient samples required | |
|---|---|---|---|---|---|---|
| | | | Tiles | Precincts | Tiles | Precincts |
| 128 × 128 thumbnail (res = 4) | 128 × 128 | 32 × 32 | 1, | 4, | 128 × 128 | 128 × 128 |
| | 256 × 256 | 64 × 64 | 1, | 2, | 128 × 128 | 128 × 128 |
| | 512 × 512 | 128 × 128 | 1, | 1, | 128 × 128 | 128 × 128 |
| | 1024 × 1024 | 256 × 256 | 1, | 1, | 128 × 128 | 128 × 128 |
| | 2048 × 2048 | 512 × 512 | 1 | 1 | 128 × 128 | 128 × 128 |
| 512 × 512 whole image (res = 2) | 128 × 128 | 32 × 32 | 1, | 16, | 512 × 512 | 512 × 512 |
| | 256 × 256 | 64 × 64 | 1, | 8, | 512 × 512 | 512 × 512 |
| | 512 × 512 | 128 × 128 | 1, | 4, | 512 × 512 | 512 × 512 |
| | 1024 × 1024 | 256 × 256 | 1, | 2, | 512 × 512 | 512 × 512 |
| | 2048 × 2048 | 512 × 512 | 1 | 1 | 512 × 512 | 512 × 512 |
| 1/32 × 1/32 of full resolution, i.e. 64 × 64 pixels in top left corner (xo = 0.0&yo = 0.0&w = 0.03125 &h = 0.03125) | 128 × 128 | 32 × 32 | 8, | 16, | 1 × 128 × 128; | 19 × 32 × 32; |
| | 256 × 256 | 64 × 64 | 8, | 13, | 1 × 256 × 256; | 16 × 64 × 64; |
| | 512 × 512 | 128 × 128 | 8, | 10, | 1 × 512 × 512; | 13 × 128 × 128; |
| | 1024 × 1024 | 256 × 256 | 8, | 7, | 1 × 1024 × 1024; | 10 × 256 × 256; |
| | 2048 × 2048 | 512 × 512 | 8 | 4 | 1 × 2048 × 2048 | 7 × 512 × 512 |

TABLE 4-continued

Disk Access And Coefficients Dependence On Tile And Precinct Size

| Client Side Viewing Window (512 × 512) | Size of Tile | Size of Precinct | Number of disjoint locations accessed on the server end | | Number of wavelet coefficient samples required | |
|---|---|---|---|---|---|---|
| | | | Tiles | Precincts | Tiles | Precincts |
| Next 1/32 × 1/32 of | 128 × 128 | 32 × 32 | 8, same tile | 16, | 1 × 128 × 128; | 19 × 32 × 32; |
| full resolution, i.e. 64 × 64 | 256 × 256 | 64 × 64 | 8, same tile | 13, same prec. | 1 × 256 × 256; | 16 × 64 × 64; |
| pixel next right- | 512 × 512 | 128 × 128 | 8, same tile | 10, same prec. | 1 × 512 × 512; | 13 × 128 × 128; |
| adjacent corner | 1024 × 1024 | 256 × 256 | 8, same tile | 7, same prec. | 1 × 1024 × 1024; | 10 × 256 × 256; |
| (xo = 0.03125&yo = 0.0 | 2048 × 2048 | 512 × 512 | 8, same tile | 4, same prec. | 1 × 2048 × 2048 | 7 × 512 × 512 |
| &w = 0.03125&h = 0.03125) | | | | | | |
| Zoom out by 2 and | 128 × 128 | 32 × 32 | 8, same tile | 16, | 1 × 128 × 128; | 19 × 32 × 32; |
| display 1/16 × 1/16 of | 256 × 256 | 64 × 64 | 8, same tile | 13, same prec. | 1 × 256 × 256; | 16 × 64 × 64; |
| full resolution image | 512 × 512 | 128 × 128 | 8, same tile | 10, same prec. | 1 × 512 × 512; | 13 × 128 × 128; |
| i.e. display window = 32 × 32, | 1024 × 1024 | 256 × 256 | 8, same tile | 7, same prec. | 1 × 1024 × 1024; | 10 × 256 × 256; |
| and display | 2048 × 2048 | 512 × 512 | 8, same tile | 4, same prec. | 1 × 2048 × 2048 | 7 × 512 × 512 |
| 64 × 64 image | | | | | | |
| (res = 1&xo = 0.0&yo = 0.0 | | | | | | |
| &h = 0.03125&w = 0.03125) | | | | | | |
| Zoom in by 2 and | 128 × 128 | 32 × 32 | 8, same tile | 16, | 1 × 128 × 128; | 19 × 32 × 32; |
| display 1/32 × 1/32 of | 256 × 256 | 64 × 64 | 8, same tile | 13, same prec. | 1 × 256 × 256; | 16 × 64 × 64; |
| full resolution image | 512 × 512 | 128 × 128 | 8, same tile | 10, same prec. | 1 × 512 × 512; | 13 × 128 × 128; |
| i.e. display window = 64 × 64, | 1024 × 1024 | 256 × 256 | 8, same tile | 7, same prec. | 1 × 1024 × 1024; | 10 × 256 × 256; |
| and display | 2048 × 2048 | 512 × 512 | 8, same tile | 4, same prec. | 1 × 2048 × 2048 | 7 × 512 × 512 |
| 64 × 64 top left corner | | | | | | |
| (xo = 0.0&yo = 0.0&w = 0.03125 | | | | | | |
| &h = 0.03125) | | | | | | |
| Right adjacent 1/32 × 1/32 | 128 × 128 | 32 × 32 | 8, same tile | 16, | 1 × 128 × 128; | 19 × 32 × 32; |
| image, i.e. next | 256 × 256 | 64 × 64 | 8, same tile | 13, same prec. | 1 × 256 × 256; | 16 × 64 × 64; |
| 64 × 64 pixels | 512 × 512 | 128 × 128 | 8, same tile | 10, same prec. | 1 × 512 × 512; | 13 × 128 × 128; |
| (xo = 0.03125&yo = 0.0 | 1024 × 1024 | 256 × 256 | 8, same tile | 7, same prec. | 1 × 1024 × 1024; | 10 × 256 × 256; |
| &h = 0.03125&w = 0.03125) | 2048 × 2048 | 512 × 512 | 8, same tile | 4, same prec. | 1 × 2048 × 2048 | 7 × 512 × 512 |
| 3/4 of 3/4 image, i.e. | 128 × 128 | 32 × 32 | 12 × 8, | 136, | 144 × 128 × 128, | 1285 × 32 × 32; |
| 1536 × 1536 image in | 256 × 256 | 64 × 64 | 6 × 8, | 64, | 36 × 256 × 256; | 538 × 64 × 64; |
| a 512 × 512 display | 512 × 512 | 128 × 128 | 3 × 8, | 28, | 9 × 512 × 512; | 150 × 128 × 128; |
| window | 1024 × 1024 | 256 × 256 | 8, | 10, | 4 × 1024 × 1024; | 43 × 256 × 256; |
| (res = ?&xo = 0.0&yo = 0.0 | 2048 × 2048 | 512 × 512 | 8 | 1 | 1 × 2048 × 2048 | 1 × 512 × 512 |
| &w = 0.75&h = 0.75) | | | | | | |
| Bottom left 1/4 × 1/4 | 128 × 128 | 32 × 32 | 4 × 8, | 46, | 16 × 128 × 128; | 259 × 32 × 32; |
| image, i.e. 512 × 512 | 256 × 256 | 64 × 64 | 2 × 8, | 26, | 4 × 256 × 256; | 73 × 64 × 64; |
| image | 512 × 512 | 128 × 128 | 8, | 13, | 1 × 512 × 512; | 13 × 128 × 128; |
| (xo = 0.75&yo = 0.75& | 1024 × 1024 | 256 × 256 | 8, | 10, | 1 × 1024 × 1024; | 10 × 256 × 256; |
| w = 0.25&h = 0.25) | 2048 × 2048 | 512 × 512 | 8 | 7 | 1 × 2048 × 2048 | 7 × 512 × 512 |
| Bottom right 1/32 × 1/32 | 128 × 128 | 32 × 32 | 8, | 19, | 1 × 128 × 128; | 19 × 32 × 32; |
| image, i.e. 64 × 64 | 256 × 256 | 64 × 64 | 8, | 16, | 1 × 256 × 256; | 16 × 64 × 64; |
| image | 512 × 512 | 128 × 128 | 8, | 13, | 1 × 512 × 512; | 13 × 128 × 128; |
| (xo = 0.96875&yo = 0.96875 | 1024 × 1024 | 256 × 256 | 8, | 10, | 1 × 1024 × 1024; | 10 × 256 × 256; |
| &w = 0.03125&h = 0.03125) | 2048 × 2048 | 512 × 512 | 8 | 7 | 1 × 2048 × 2048 | 7 × 512 × 512 |

Session Persistence

In one embodiment, the protocol avoids retransmission of data even over multiple connections separated in time via several mechanisms. This may be achieved by having the client use one of the http headers (e.g., T2 cache) to indicate the data already sent to the client. An alternative mechanism of providing session persistence is to use a cookie to keep a session ID as is done for many commercial websites today. The session ID parameter may also be used to resume a session where it left off. Of course, the server may no longer have a record of the session and would simply transmit the portions of the codestream assuming the client had nothing stored.

Error Handling

With respect to error handling, HTTP includes a variety of response messages for error conditions. All of these are available for use with this protocol. Retransmission can be requested between the stages if an error is detected. HTTP footers can be used to send checksums of the transmitted data, thereby detecting errors.

Rate Control

With respect to rate control, the transport level protocol and libraries implementing sockets for example typically ensure the client is not sent data at a rate faster than it can be handled. The "send" call in most socket libraries blocks until data is sent, or returns an error if too much data is sent. Sending large responses in chunked format should also prevent any single "send" from being too large. In one embodiment, a parameter such as a maximum bytes parameter may be used to limit the number of bytes. Also, the client and/or server may be allowed to do rate control. This would control the filling of buffers on a slow link.

The transport protocol does provide the maxh and maxw parameters that allow a client to specify the largest image that is useful. The client may also request translation to JPEG or PNG.

Support for Simultaneous Access

The transport protocol described herein does not limit simultaneous access to the same image on a server. In one embodiment, if a single client opens multiple connections to the same resource on the same server, each connection is served in the order of requests on that connection. If the client wishes it could specify with the T3 cache or T2 cache headers that it has received data that it never requested on a given connection. Otherwise, the server has no way of knowing the two connections are going to exactly the same client.

In an alternative embodiment, a session key could be added to the HTTP for all levels of requests and responses to connect separate requests. This is a typical way to deal with the stateless nature of HTTP. This would allow the protocol described herein to operate without the default "keep-alive" feature of HTTP 1.1. It also allows better usage over unreliable networks. It may be useful to add a request number to serialize requests within the session. Thus, even with HTTP over TCP, multiple connections could be created and used. Session keys could be implemented with the "Cookie:" header or as request parameter.

JPIP Request Bindings

Note that HTTP can be carried over channels other than TCP/IP. Thus, if it is desired to use this protocol over a non-TCP/IP channel, that supports HTTP, no new definitions are required. In one embodiment, in the event that it is desirable to specify protocol bindings for channels with uncorrected errors or packet loss, each chunk of the responses using the chunked transfer encoding may be made a unique network packet. All other requests and responses fit within a network packet. In one embodiment, these are given a packet number in the order they would be sent out for a connection oriented channel. Note also that a protocol other than HTTP may be used.

Capability Exchange and Negotiation

In one embodiment, capabilities is requested by using the HTTP method "HEAD" which requests just the headers of the response, the client is thus able to determine the type of response it would have received with a "GET" request. An example looks like:

HEAD filename.jp2?res=2 HTTP/1.1
Host: truew.crc.ricoh.com
CRLF

In one embodiment, capabilities of the server is requested with the HTTP method "OPTIONS" e.g., OPTIONS * HTTP/1.1
Host: truew.crc.ricoh.com
CRLF In one embodiment, capabilities for operation on a specific image are determined with:

OPTIONS filename.jp2 HTTP/1.1
Host: truew.crc.ricoh.com
CRLF

The HTTP 1.1 RFC contains mechanisms for indicating capabilities. For the image protocol described herein, a server might return a header with some the following lines:

Accept-Ranges: bytes, tile-parts
Accept: image/jpeg2000;q=0.9 image/gif;q=0.5 image/jpipT2;q=0.95 image/jpipT 3;q=0.1
Allow: GET,HEAD,POST,OPTIONS,TRACE
Vary: accept,*

The HTTP 1.1 RFC contains mechanisms for indicating capabilities. For the image protocol described herein, a header like the following is useful:

Accept-Ranges: bytes, tile-parts

"Accept-Ranges: bytes" is a legal HTTP/1.1 command. In one embodiment, a server uses this in the transport protocol to indicate ability to respond to direct byte range requests. In such a case, a smart client then extracts exactly the desired portions of the codestream or file-format.

Use of the "Accept-Ranges: tile-parts" would be a way for the server to indicate ability to respond to direct requests for tile-parts.

Accept: image/jpeg2000;q=0.9 image/gif;q=0.5 image/jpipT2;q=0.95 image/ jpipT 3;q=0.1

Note that HTTP allows not only a capability in the Accept header, but also a preference. A JPEG 2000 image server that is capable of transcoding the image might return a viewport request with the type that both the client and the server support with the highest preference value. Alternatively, the server might decide to return a lower preference type because it would be a lesser burden on the server (e.g., it might return a type that didn't require decompression and recompression if the server load is high), or might ultimately lead to lower bandwidth with multiple requests.

Allow: GET,HEAD,POST,OPTIONS,TRACE

This HTTP line shows the commands the server will permit. They would be used in an image server just as they are currently used.

Vary: accept,*

The Vary header indicates the response may depend on the return types the client indicates it accepts. The '*' indicates the response may depend on things outside of the http headers. In a server in a system using the protocol described herein, the exact content returned might depend on previous requests. For example, a server does not return tile-parts it believes the client already has. This is important for a HTTP proxy to realize because the returned data may not be good for an equivalent request from a client that does not have the same set of tile-parts.

Uniquely Identifying an Image

Note that HTTP has mechanisms for uniquely identifying resources. The "Etag" uniquely identifies a response, see section 14.19 of HTTP 1.1 RFC 2616 [HTTP Standard].

JPEG 2000 Part I defines a UUID box see section I.7.2 of [ITU-T Rec. T.800 | IS 15444-1:2000, Information Technology—JPEG 2000 image coding system: Core coding system]. The protocol request syntax described herein allows for the return of boxes, this box can be requested to determine image uniqueness.

Also HTTP headers like "Expires" allow the client to know when the cached data is no longer valid. See section 14.21 of [HTTP Standard].

Uploading Images to the Server

An entire image could be uploaded using the HTTP method POST. In this case, the syntax looks exactly like any other file upload. The transport protocol allows uploading of entire tile parts. In this case, the header indicates which tile part is being uploaded using the Tier 2 syntax. The client provides all tile parts for each tile that is uploaded. The server removes all tile-parts for the tiles uploaded and stores the new tile parts. The server may choose to store the tile parts in an order different from the original order of the file. Of course, tile parts of the same tile are stored in order. Further, any TLM must be updated. Servers may choose to refuse to update images using PPM marker segments. Of course, servers may choose not to upload images or tile-parts at all. Some servers may choose to support the HTTP method DELETE. No special syntax is required for JPEG 2000 images for this method.

Other Capabilities

It is useful to be able to return an image after a single request. The most obvious example is a web page with inline imagery. The image tag should allow an image to be returned. The writer of the web page knows about the image to be included, and knows they layout of their page, since they are providing the URL, they probably also know the capabilities of the server. There is no need to "exchange capabilities" and then get an image.

In one embodiment, for browsers understanding JPEG 2000 images, the system using the protocol described herein supports a call like:

<img src="http://truew.crc.ricoh.com/name.jp2?res=2" width="128" height="115"> which would return a jp2 file with the low resolution portion. In one embodiment, the browser, as with JPEG and GIF images, scales this to fit the author desired 128×115 window.

To insure any browser could read the image, the img tag could request the image be translated to PNG (or GIF or JPEG):

<img src="http://truew.ricoh.com/name.jp2?res=2&tier3=PNG" width="128" height="115">

The server would still access an JP2 file, but it would be translated before delivery Extensions/Alternatives Using the POC Marker to Rewrite Tile-Parts "on the Fly"

In one embodiment, the protocol described herein only serves tile parts as they exist on the server. While different regions can be accessed out of order, all tile parts are; accessed in order. Thus, if the client desires access to component 2 and components 0 and 1 are stored first in the tile-part, as is likely to be the case in all typical progression orders, unrequested data must be sent.

However, in an alternative embodiment, a server could rearrange the tile parts within a tile to exactly the order requested by the client. In one embodiment, the server uses a POC marker of the JPEG 2000 Standard with each tile part to specify the resolutions, layers and components contained in the tile-part. This requires more buffering on the part of the server. Caching is much more difficult as the server keeps track of the way the codestream was rearranged. In one embodiment, this is done by keeping track of the request commands. In one embodiment, the server uses an internal data structure to make requests and responses. In one embodiment, the server writes a copy of the file in the order the client requested it.

Suppose the server contains a 3 component JPEG 2000 file with tile-parts arranged in RLCP order, with one tile-part for each resolution. Suppose there is only one layer and one precinct per tile-part. The tile-part data might look like:

SOT marker segment (Tile 0, Length of tile-part, Part 0, Number of Part 0)
SOD marker
Packet Header/Body for Resolution 0, Layer 0, Component 0, Position 0 (R0L0C0P0)
Packet Header/Body for R0L0C1P0
Packet Header/Body for R0L0C2P0

If the client requests only the first component (numbered 0), the server might send the entire tile-part including data from components 1 and 2. This could be inefficient if there is a lot of data for the unwanted components. Instead, a server could create and send the client a tile-part that does not actually appear in the file containing only the first component. Because the main header indicates that there is more than one component in the file, the server indicates that this tile-part only contains one component. There are several ways the server could change the file to provide things in a different order:

The progression order might be changed to CPRL, and thus the client would expect component 0 to come first. This works if the client requests component 0 and not component 2 first.

The packets for other components could be changed to have zero data. This is equivalent to changing the layer assignment so that data for other components doesn't appear until later packets. However, it is still necessary to include a one byte packet header for each packet skipped to serve as a place holder. Further, when data from other components is requested the packet headers must be written to include the correct layer information.

In one embodiment, a POC marker segment is included in the tile-part header. The tile part then looks like:

SOT marker segment (Tile 0, Length of tile-part, Part 0, Number of Part 0)
POC marker segment(Resolution start=0, Component start=0, layer end=1, resolution end=1, component end =1)
SOD marker
Packet Header/Body for Resolution 0, Layer 0, Component 0, Position 0 (R0L0C0P0)

This tile-part now contains only the requested data. A future request can lead to the generation of a new tile-part with a new POC marker again containing only the data requested. The packets themselves need not be changed in anyway, only the order they are sent is changed.

In any case, one key advantage of this technique is the client still at all times has a legal JPEG 2000 file with no additional structure to keep track of the portions of the codestream received.

Additional Use Case: Memoryless Decoderless Client

An extremely simple client might not have much more memory than the display area of the client, but it might still desire to browse an extremely large image. It cannot be expected to cache any compressed image data. It might not even have a JPEG 2000 decoder. However, this client could communicate with a JPEG 2000 server and make Tier 3 requests, and receive Tier 3 responses.

An Exemplary Computer System

Figure 8:
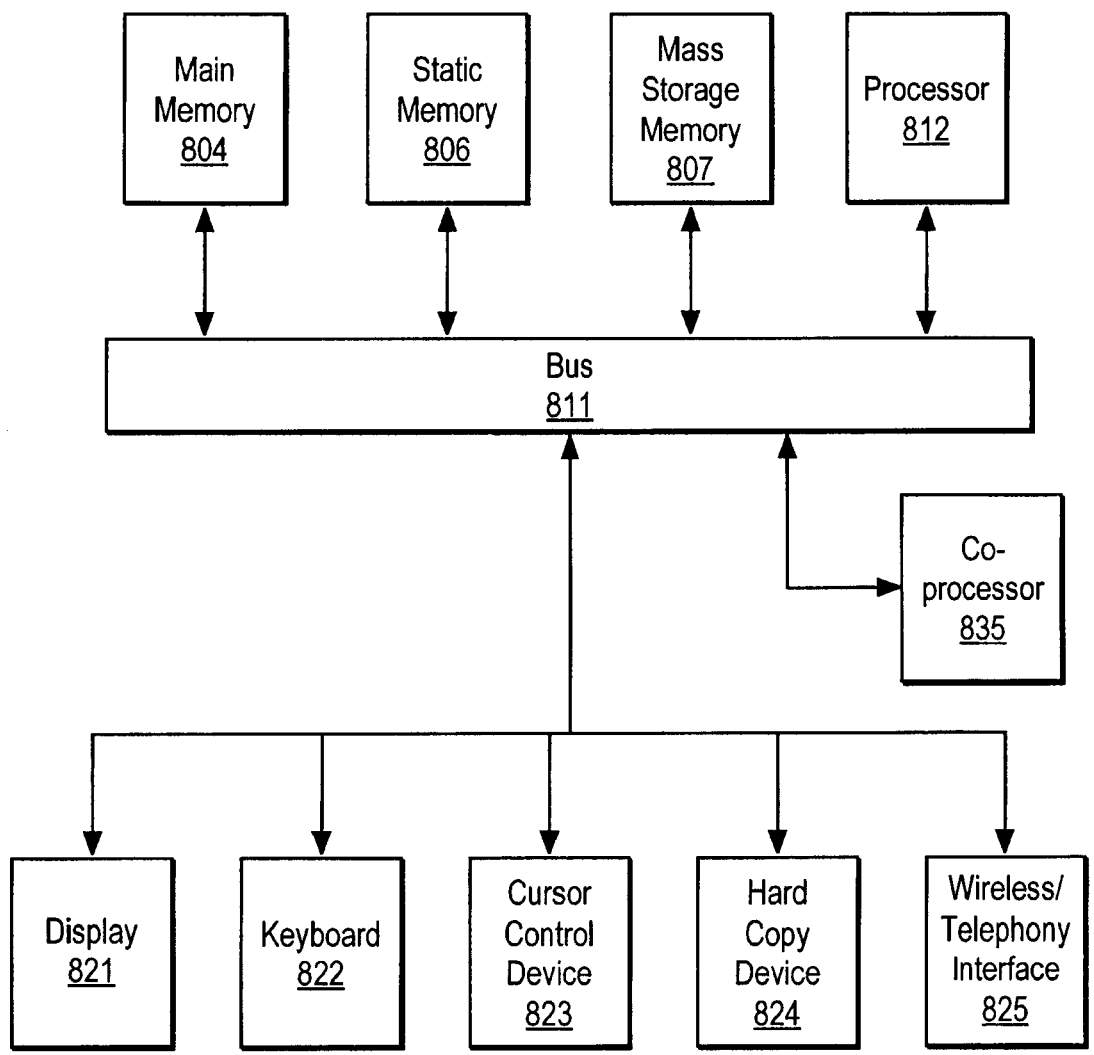
FIG. 8 is a block diagram of one embodiment of a computer system.

FIG. 8 is a block diagram of an exemplary computer system that may perform one or more of the operations described herein. Referring to FIG. 8, computer system 800 may comprise an exemplary client or server. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communicate to a phone or handheld palm device or other computer or server.

Another device that may be coupled to bus 811 is a coprocessor 835, which may comprise, for example, a digital signal processor (DSP) or special compression (and/or decompression) hardware.

Note that any or all of the components of system 800 and associated hardware may be used in the present invention. However, it can be appreciated that other configurations of the computer system may include some or all of the devices.

In the description above, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system including a server and a client, comprising:
   the client including
      a first sending device to send a viewport request to the server to request an image object,
      a first receiving device to receive an image object according to the viewport request, and
      a display device to display the image object received by the first receiving device; and
   the server including
      a first storage device to store a JPEG2000 codestream,
      a second storage device to store information on tile-parts corresponding to a tile and a bit, the tile comprises the JPEG2000 codestream and the bit represents whether the server has already sent the tile to the client,
      a second receiving device to receive the viewport request from the client,
      a specifying device to specify a tile of JPEG2000 codestream based on the information regarding tile-parts, wherein the tile is specified by the viewport request received by the second receiving device,
      an extracting device to extract a tile which has not been sent to the client yet in the JPEG2000 code stream specified by the specifying device,
      a decoder to create an image object by decompressing the tile, and
      a second sending device to send a image object created by the decoder to the client as a response of the viewport request.

2. The system defined claim 1, wherein the viewport request includes at least a file name of the image object, a parameter of desired resolution, a parameter of desired region, and a parameter of desired quality.

3. The system defined claim 1, wherein the client and the server exchange requests and response over a network selected from a group consisting of a local area network (LAN), a wide area network (WAN), the Internet, and the World Wide Web (WWW).

4. The system defined claim 1, wherein the responses comprise HTTP responses.

5. The system defined claim 4, wherein the server and the client use HTTP chunked transfer encoding to exchange requests and responses.

6. The system defined claim 5, wherein at least one of the responses from the server is ended without closing an HTTP channel.

7. The system defined claim 1, wherein the requests and responses processed at the server are with byte ranges, specified using program calls, of complete tile-parts of the JPEG 2000 codestream.

8. The system defined claim 7, wherein the program comprises a C program.

9. The system defined claim 8, wherein the program caller comprises a sequence of fseek( ) and fread( ) calls.

10. A method, comprising:
    storing, with a first storage device of a server, a JPEG2000 codestream;
    storing, with a second storage device of the server, information on tile-parts corresponding to a tile and a bit, the tile comprises the JPEG2000 codestream and the bit represents whether the server has already sent the tile to a client;
    sending, with a first sending device of the client, a viewport request to the server to request an image object;
    receiving, with a second receiving of the server, the viewport request from the client;
    specifying, with a specifying device of the server, a tile of JPEG2000 codestream based on the information regarding tile-parts, wherein the tile is specified by the viewport request received by the second receiving device;
    extracting, with an extracting device of the server, a tile which has not been sent to the client yet in the JPEG2000 code stream specified by the specifying device;
    creating, with a decoder of the server, an image object by decompressing the tile;
    sending, with a second sending device of the server, an image object created by the decoder to the client as a response of the viewport request;
    receiving, with a first receiving device of the client, an image object according to the viewport request; and
    displaying, with a display device of the client, the image object received by the first receiving device.

11. The method defined claim 10, wherein the viewport request includes at least a file name of the image object, a parameter of desired resolution, a parameter of desired region, and a parameter of desired quality.

12. The method defined claim 10, wherein the client and the server exchange requests and response over a network selected from a group consisting of a local area network (LAN), a wide area network (WAN), the Internet, and the World Wide Web (WWW).

13. The method defined claim 10, wherein the responses comprise HTTP responses.

14. The method defined claim 13, wherein the server and the client use HTTP chunked transfer encoding to exchange requests and responses.

15. The method defined claim 14, wherein at least one of the responses from the server is ended without closing an HTTP channel.

16. The method defined claim 10, wherein the requests and responses processed at the server are with byte ranges, specified using program calls, of complete tile-parts of the JPEG 2000 codestream.

17. The method defined claim 16, wherein the program comprises a C program.

18. The method defined claim 17, wherein the program caller comprises a sequence of fseek( ) and fread( ) calls.

19. An article of manufacture comprising one or more recordable media storing instructions thereon which, when executed by a system, cause the system to perform a method comprising:
    storing, with a first storage device of a server, a JPEG2000 codestream;
    storing, with a second storage device of the server, information on tile-parts corresponding to a tile and a bit, the tile comprises the JPEG2000 codestream and the bit represents whether the server has already sent the tile to a client;
    sending, with a first sending device of the client, a viewport request to the server to request an image object;
    receiving, with a second receiving of the server, the viewport request from the client;
    specifying, with a specifying device of the server, a tile of JPEG2000 codestream based on the information regarding tile-parts, wherein the tile is specified by the viewport request received by the second receiving device;
    extracting, with an extracting device of the server, a tile which has not been sent to the client yet in the JPEG2000 code stream specified by the specifying device;
    creating, with a decoder of the server, an image object by decompressing the tile;
    sending, with a second sending device of the server, an image object created by the decoder to the client as a response of the viewport request;
    receiving, with a first receiving device of the client, an image object according to the viewport request; and
    displaying, with a display of the client, the image object received by the first receiving device.

* * * * *